US 8,965,957 B2

(12) United States Patent
Barros

(10) Patent No.: US 8,965,957 B2
(45) Date of Patent: Feb. 24, 2015

(54) SERVICE DELIVERY FRAMEWORK

(75) Inventor: Alistair Barros, Camira (AU)

(73) Assignee: SAP SE, Walldorf (DE)

( * ) Notice: Subject to any disclaimer, the term of this patent is extended or adjusted under 35 U.S.C. 154(b) by 623 days.

(21) Appl. No.: 12/969,141

(22) Filed: Dec. 15, 2010

(65) Prior Publication Data

US 2012/0158821 A1 Jun. 21, 2012

(51) Int. Cl.
| G06F 15/16 | (2006.01) |
| G06F 15/173 | (2006.01) |
| G06F 9/50 | (2006.01) |
| G06F 17/30 | (2006.01) |

(52) U.S. Cl.
CPC ........ G06F 9/5055 (2013.01); G06F 17/30563 (2013.01)
USPC ........... 709/203; 709/217; 709/218; 709/219; 709/226; 709/227; 709/228; 709/248

(58) Field of Classification Search
CPC ... H04L 67/02; H04L 67/325; H04L 67/2814; H04L 67/2842; H04L 67/2852; H04L 63/08; H04L 63/083; H04L 63/20; H04L 63/0428; H04L 69/329; H04L 29/06
USPC .......... 709/203, 217–218, 220, 226–228, 248
See application file for complete search history.

(56) References Cited

U.S. PATENT DOCUMENTS

| 7,590,709 | B2 * | 9/2009 | Kikuchi | 709/219 |
| 7,965,703 | B2 * | 6/2011 | Rieger | 370/352 |
| 8,027,296 | B2 * | 9/2011 | Hu et al. | 370/329 |
| 8,229,860 | B2 * | 7/2012 | Hwang | 705/75 |
| 2002/0046262 | A1 * | 4/2002 | Heilig et al. | 709/219 |
| 2004/0088250 | A1 * | 5/2004 | Bartter et al. | 705/39 |
| 2005/0044197 | A1 * | 2/2005 | Lai | 709/223 |
| 2005/0086330 | A1 * | 4/2005 | Perham et al. | 709/220 |
| 2006/0031562 | A1 * | 2/2006 | Satomi | 709/232 |
| 2006/0225132 | A1 * | 10/2006 | Swift et al. | 726/11 |
| 2007/0291741 | A1 * | 12/2007 | Hwang | 370/352 |
| 2009/0227231 | A1 * | 9/2009 | Hu et al. | 455/410 |
| 2009/0248580 | A1 * | 10/2009 | Baentsch et al. | 705/67 |

(Continued)

OTHER PUBLICATIONS

Gustavo Alonso et al., "Web Services: Concepts, Architectures and Applications," Springer-Verlag, 2004, 380 pages.

(Continued)

*Primary Examiner* — David Lazaro
*Assistant Examiner* — Farzana Huq
(74) *Attorney, Agent, or Firm* — Fish & Richardson P.C.

(57) ABSTRACT

Implementations include receiving service information regarding one or more services provided by one or more service providers, the services being executed by one or more service computing devices, storing the service information on a computer-readable storage device that is in communication with the one or more broker computing devices, receiving user input at the one or more broker computing devices, the user input being transmitted to the one or more broker computing devices from one or more consumer computing devices over a service channel that corresponds to a service being accessed by a service consumer, transmitting the user input to the one or more service computing devices, receiving service output from the one or more service computing devices, the service output generated based on processing of the user input using the service, and transmitting the service output to the one or more consumer computing devices over the service channel.

20 Claims, 14 Drawing Sheets

(56) References Cited

U.S. PATENT DOCUMENTS

2011/0142212 A1* 6/2011 Kim et al. .................. 379/93.02
2012/0246716 A1* 9/2012 Chang et al. .................... 726/17

OTHER PUBLICATIONS

Barros, "SOA for Business Network—Service Delivery Framework," Applying Real-World BPM in an SAP Environment, SAP Press, Rosenberg, Chase, Omar, Taylor, von Rosing, Galileo Press, Inc., 2011, pp. 631-632.

Barros, et al., "The Rise of Web Service Ecosystems," IEEE Computer Society, IT Professional, vol. 8, No. 5, Sep./Oct. 2006, pp. 31-37.

Hammond, et al., "Service Delivery Platforms and Telecom Web Services," A Moriana Group Thought Leader report, May 2014, 14 pages.

Cardoso, "Towards a Unified Service Description Language for the Internet of Services: Requirements and First Developments," IEEE International Conference on Services Computing, 2010, pp. 602-609.

Mertz, et al., "Forecast Analysis: Software as a Service, Worldwide, 2009-2014," Gartner, Inc. Jul. 1, 2010, 28 pages.

Heuser, et al., International Research Forum 2008: Yhe Web-Based Service Economy and the Internet of Services, Evolved Media Network, Evolved Media, LLC., 2009, 303 pages.

John Langley Jr., Ph.D., "The State of Logistics Outsourcing: 2009 third-party logistics," 2009, 48 pages.

Rodriguez, Pablo "Web Infrastructure for the 21st Century," Proceedings of 18th International World Wide Web Conference, Madrid, Spain, Apr. 2009, 48 pages.

Vinay Singla, "The Overlapping Worlds of SaaS and SOA," retrieved online from http://cloudcomputing.sys-con.com/?q=node/1047073, Jul. 27, 2009, 5 pages.

Shailendra C. Jain Palvia et al., "E-Government and E-Governance: Definitions/Domain Framework and Status around the World," Computer Science of India, Foundations of E-government, 5th International Conference on EGovernance, Hyderabad, India, 2007, 12 pages.

Sharma, S.K., "E-Government Services Framework," Encyclopedia of Commerce, EGovernment, and Mobile Commerce, Mehdi Khosrow-Pour, Information Resources Management Association, USA, vol. 1, A-J, Idea Group Reference, pp. 373-378.

Jeffrey Word, "Business Network Transformation: Strategies to Reconfigure Your Business Relationships for Competitive Advantage," Jossey-Bass, 2009, 306 pages.

* cited by examiner

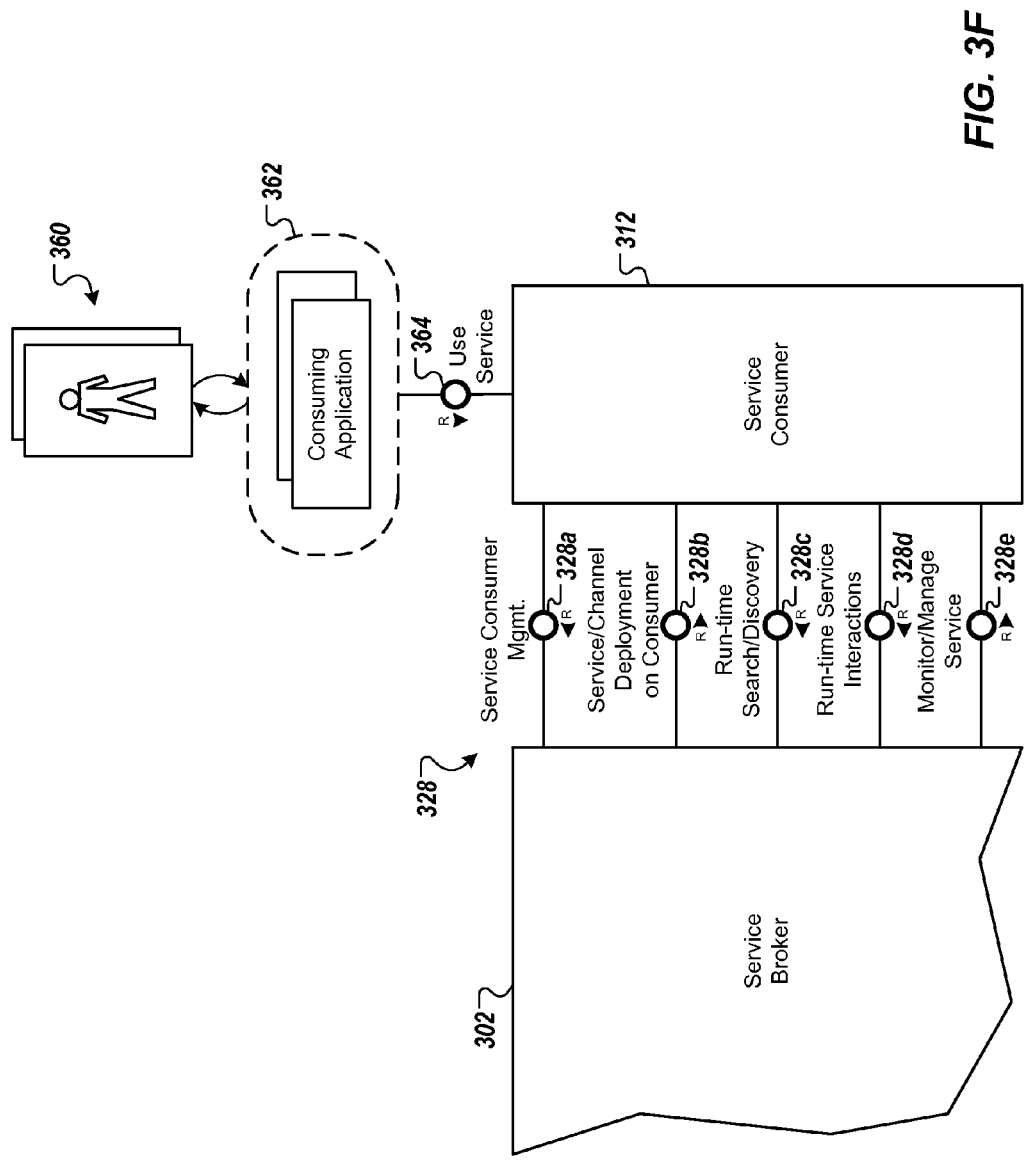

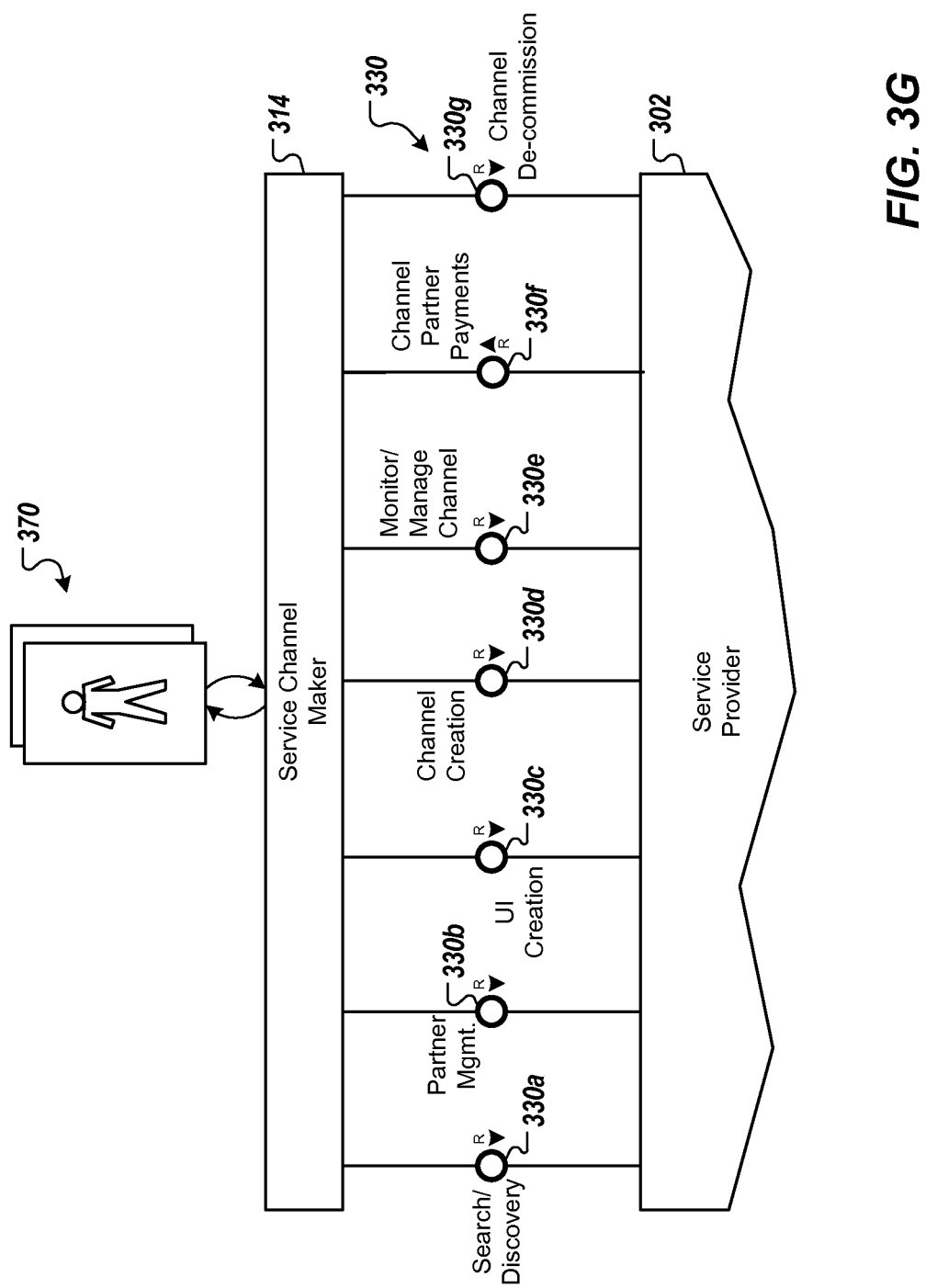

SERVICE DELIVERY FRAMEWORK

BACKGROUND

The growth in on-demand applications has surged to the point where demand is forecasted to exceed growth of on-premise applications in the coming years. Through software-as-service (SaaS) and cloud-based deployments accessed over the worldwide web (Web), on-demand offerings now extend to desktop, enterprise, supply chain management/logistics, utilities and many other segments. In response to this, a wave of "Appstore" initiatives has emerged as smaller software oriented architecture (SOA) style platforms to procure service-based software from central points and communities.

Attention is also turning to large enterprises and how large enterprises can leverage SaaS and marketplaces/hubs. For example, business applications in banks and financial institutes, public sector and manufacturing and other mainstream industries contain valuable data and functionality. In turn, these applications need to integrate with external services in order to enhance the decision making quality and other aspects of business processes. Having access to a reserve of external services can drastically reduce overhead and increase efficiencies in line-of-business activities.

Services in large enterprises relate to a myriad of applications in the form of multi-vendor suite solutions, home-grown applications and third-party, business process outsourcing (BPO) solutions, all operating within complex information technology (IT) landscapes and on-premise hosts. They are typically transactional, long-running and have complex data dependencies across different applications. This makes it difficult and sometimes impossible to create decoupled services that are redeployed onto external clouds. Unlike today's SaaS offerings, opening up transactional services for wider, commoditized use through marketplaces and hubs requires that services continue to execute from their secure, hosted environments.

Third-party business-to-business (B2B) gateways and integration platforms have emerged to reduce the costs of adapting and integrating transactional, enterprise services across trading partners. Because applications of trading partners are built independently, they face a complex integration challenges when opening up to business networks.

Taken together, the growth of the on-demand model adoption, now seen through platform accelerators in "Appstores," B2B gateways, BPO initiatives, service marketplaces and business network collaboration hubs, poses strategic uncertainties for the corporate world. Questions remain as to how customers best procure their services beyond organizational boundaries and also exploit services from the external environment, and how can such a strategy scale for all partners in business networks so that it fosters operational transformation on the business network. Correspondingly, software vendors are faced with the challenge of creating a comprehensive platform strategy for not only allowing their applications across different product segments and technology stacks to be accessed, as services, but also to support service access and delivery needs of partners in a business network.

SUMMARY

The present disclosure is generally directed to a software deliver framework that provides a common integration platform for the provisioning and delivery of services, in communities, ecosystems and business networks. The SDF of the present disclosure supports multiple industries and deployments where a software oriented architecture (SOA) delivery platform is used for collaborating partners and diverse consumers. For example, the SDF of the present disclosure enables providers to publish their services into network directories so that they can be repurposed, traded and consumed. Unlike current platforms. The SDF brokers complex enterprise and business services, and enables utilities in the business network to be leveraged, opening up service hosting to a choice of clouds and adapting services through a choice of business-to-business (B2B) gateway services.

Implementations of the present disclosure include computer-implemented methods of providing a service delivery framework. In some implementations, methods include receiving, at one or more broker computing devices, service information regarding one or more services provided by one or more service providers, the services being executed by one or more service computing devices, storing the service information on a computer-readable storage device that is in communication with the one or more broker computing devices, receiving user input at the one or more broker computing devices, the user input being transmitted to the one or more broker computing devices from one or more consumer computing devices over a service channel that corresponds to a service being accessed by a service consumer, transmitting the user input to the one or more service computing devices, receiving service output from the one or more service computing devices, the service output generated based on processing of the user input using the service, and transmitting the service output to the one or more consumer computing devices over the service channel.

In some implementations, methods further include generating service delivery logic at the one or more broker computing devices, the delivery logic being based on the service information and the service channel.

In some implementations, methods further include storing data corresponding to business-to-business (B2B) gateway services in the computer-readable storage device, receiving a search query from a service provider of the one or more service providers, generating a list of candidate B2B gateway services based on the search query and the data, and transmitting the list of candidate B2B gateway services to the service provider. In some implementations, methods further include receiving a selection from the service provider, the selection identifying a B2B gateway service from the list of candidate B2B gateway services, and providing an interface adaptation between one or more service computing devices of the service provider and the B2B gateway service.

In some implementations, methods further include receiving data regarding an aggregate service from one or more aggregator computing devices associated with a service aggregator, the aggregated service comprising one or more services provided by the one or more service providers, storing the data in the computer-readable storage device, receiving a search query regarding services brokered through the one or more broker computing devices, identifying the aggregate service based on the data and the search query, and transmitting information regarding the aggregate service to a source of the search query. In some implementations, each of the one or more services of the aggregated service executes in a respective operating environment that is accessed through the one or more broker computing devices based on a corresponding delivery model.

In some implementations, methods further include receiving data regarding one or more service channels, the data being provided from one or more channel maker computing devices, storing the data in the compute-readable storage device, the data comprising service channel specifications and constraints, and associating at least one of the one or more service channels with the service.

In some implementations, methods further include receiving data from the one or more consumer computing devices, the data indicating a specialist service channel, generating a list of candidate service channels based on the data, transmitting the list of candidate service channels to the one or more consumer computing devices, and receiving a selection from the one or more consumer computing devices, the selection indicating the service channel.

In some implementations, methods further include receiving a search query from the one or more consumer computing devices, comparing the search query to one or more service descriptions stored at the computer-readable storage device, each of the one or more service descriptions corresponding to a particular service, and identifying the service based on the comparing. In some implementations, the search query is specific to a type of the one or more consumer computing devices. In some implementations, the service descriptions are stored in a service catalogue, the service descriptions including attributes describing functional, non-functional and structural aspects of services.

In some implementations, methods further include storing one or more user profiles in the computer-readable storage medium, a user profile of the one or more user profiles corresponding to the user.

In some implementations, methods further include executing a certification check based on the service, and registering the service at the one or more broker computing devices when a certification of the service is approved.

In some implementations, methods further include executing one or more service broker modules at the one or more broker computing devices, the one or more service broker modules communicating with one or more service provider modules executed at the one or more provider computing devices and one or more service consumer modules executed at the one or more consumer computing devices using respective application program interfaces (APIs).

In some implementations, the one or more service computing devices are provided at a service hoster that is a partner of the service provider, the service hoster providing a backend computing environment that is interfaced with through the one or more broker computing devices.

In some implementations, methods further include monitoring performance of the service hoster using a service hoster interface executed on the one or more broker computing devices to generate monitoring information, and transmitting the monitoring information to the service provider. In some implementations, methods further include identifying hosting requirements from the service information, the hosting requirements comprising at least one of platform service requirements and operating service requirements, comparing the hosting requirements to a plurality of hosting capabilities associated with a plurality of service hosters, information regarding the hosting capabilities being stored on the computer-readable storage device, to generate a list of one or more candidate service hosters, providing the list of one or more candidate service hosters to a service provider of the service, and receiving feedback from the service provider, the feedback identifying the service hoster.

In some implementations, the user is one of a human user, and an application executed by the one or more consumer computing devices.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is to say that methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

FIGS. 3A-3G depict portions of the example SDF.

Like reference symbols in the various drawings indicate like elements.

DETAILED DESCRIPTION

Implementations of the present disclosure are generally directed to a software delivery framework (SDF) that provides a comprehensive platform strategy for supporting global service provisioning and delivery for business networks. As discussed in further detail herein, the SDF enables service providers to publish services to directories. The published services can be repurposed, traded and consumed. In particular, implementations of the SDF enables publishing and brokering of complex enterprise and business services, and enables these services to be hosted through one or more cloud services, for example. The services can be adapted through a choice of business-to-business (B2B) gateway services. The services can be aggregated by and channeled through third-parties.

In short, implementations of the SDF support diversified partnerships for provisioning of services to best-of-breed utility services and innovation resources over a network. By way of non-limiting example, and with reference to the Network Solutions Strategy provided by SAP AG of Walldorf, Germany, the SDF can be seen as a particular example of the network fabric that enables both SAP's solutions as well as those of partners and customers to be targeted towards on-demand economies and global trading networks. The SDF sets the stage for the next service-oriented revolution, referred variously as service ecosystems, future business value networks, and other forms of hubs and communities, underpinned by an Internet-scale infrastructure, to provide a level playing field for supply and demand of services on over the Internet.

Figure 1:
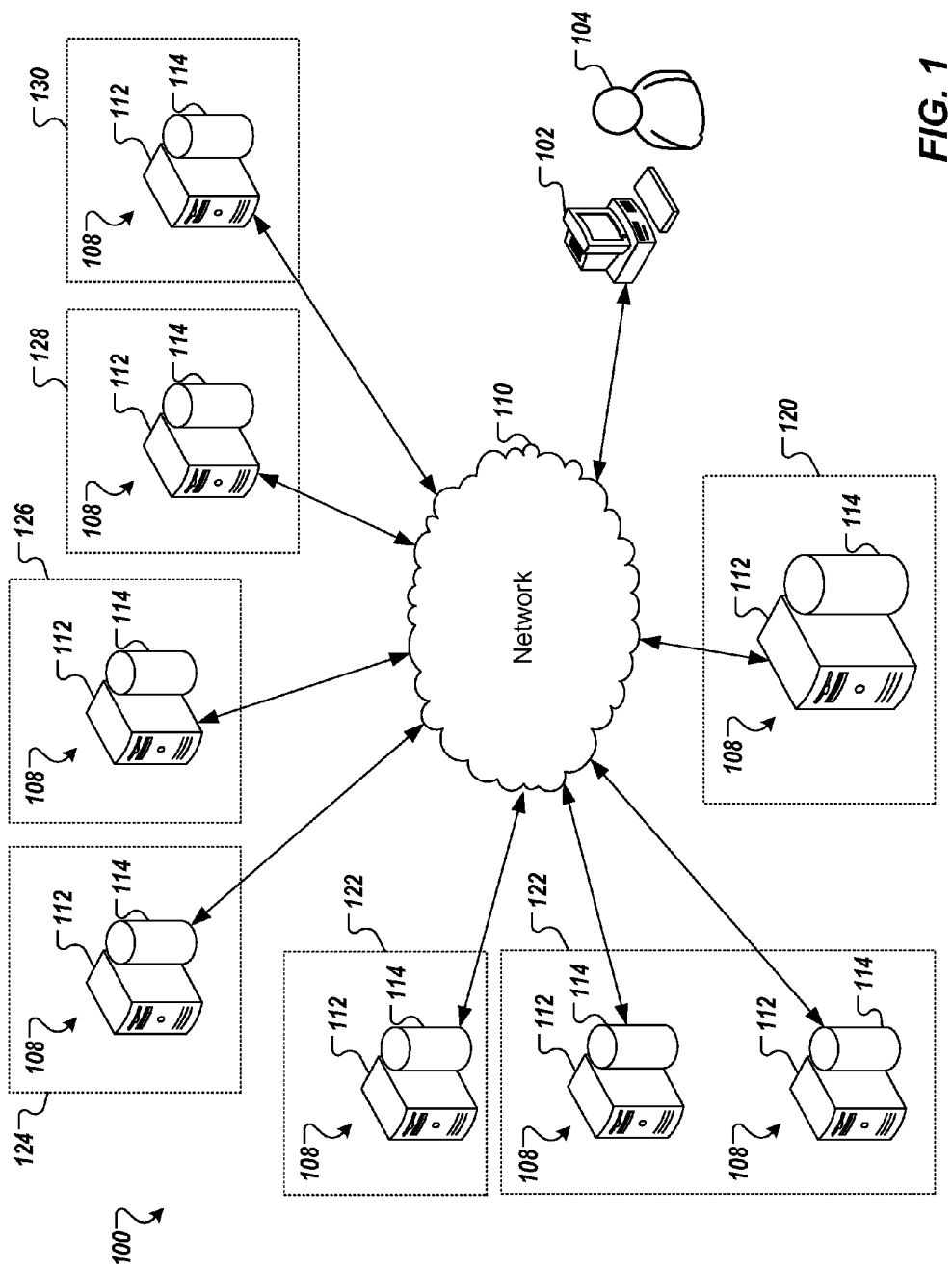
FIG. 1 depicts an example architecture that can execute implementations of a service delivery framework (SDF) the present disclosure.

FIG. 1 depicts an example system architecture 100 that can execute implementations of the present disclosure. The system architecture 100 can include a client computing device 102 associated with a user 104 and computer systems 108. The client computing device 102 can communicate with one or more of the computer systems 108 over a network 110. The computer systems 108 can communicate with each other and/or the client computing device 102 over the network 110. The computer systems 108 can each include one or more servers 112 and one or more datastores 114, respectively. In some implementations, the system architecture 100 may represent a client/server system supporting multiple computer systems (e.g., computer systems 108) including one or more clients (e.g., client computing device 102) that are connectively coupled for communication with one another over the network 110.

The client computing device 102 can represent various forms of processing devices including, but not limited to, a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of any two or more of these data processing devices or other data processing devices. The client computing device 102 may access application software on one or more of the computer systems 108.

The computer systems 108 can represent various forms of server systems including, but not limited to a web server, an application server, a proxy server, a network server, or a server farm. For example, one or more of the servers 112 can be an application server that executes software accessed by the client computing device 102. In some implementations, a user can invoke applications available on one or more of the servers 108 in a web browser running on a client (e.g., client computing device 102). Each application can individually access data from one or more repository resources (e.g., datastores 112).

In some implementations, the client computing device 102 may communicate wirelessly through a communication interface (not shown), which may include digital signal processing circuitry where necessary. The communication interface may provide for communications under various modes or protocols, such as Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver (not shown). In addition, short-range communication may occur, such as using a Bluetooth, WiFi, or other such transceiver.

The network 110 can be a large computer network, such as a local area network (LAN), wide area network (WAN), the Internet, a cellular network, or a combination thereof connecting any number of mobile clients, fixed clients, and/or servers. In some implementations, each client (e.g., client computing device 102) can communicate with one or more of the computer systems 108 via a virtual private network (VPN), Secure Shell (SSH) tunnel, or other secure network connection. In some implementations, the network 110 can include the Internet, a wireless service network and may include the Public Switched Telephone Network (PSTN). In other implementations, the network 110 may include a corporate network (e.g., an intranet) and one or more wireless access points.

The client computing device 102 can establish its own session with the computer systems 108. Each session can involve two-way information exchange between the computer systems 108 and the client computing device 102. For example, a Hypertext Transfer Protocol (HTTP) session can allow the association of information with individual users. A session can be stateful session, in which at least one of the communicating parts (e.g., the computer systems 108 or the client computing device 102) stores information about the session history in order to be able to communicate. Alternatively, stateless communication during a stateless session includes independent requests with associated responses.

The example architecture 100 can be used to realize implementations of the SDF in accordance with the present disclosure. For example, the client computing device 102 and/or the user 104 can be provided as a service consumer that accesses and uses one or more services through the SDF. As discussed in further detail herein, the SDF includes a service broker 120, one or more service providers 122, one or more service aggregators 124, one or more service channel makers 126, one or more service hosters 128 and one or more service gateways 130.

The service broker 120 can be provided by a brokerage entity. Functionality of the service broker 120, discussed in further detail herein, can be realized using one or more computer systems 108, for example. The one or more service provides 122 can include corresponding service provider entities. Functionality of the service providers 122, discussed in further detail herein, can be realized using one or more computer systems 108, for example. The one or more service aggregators 124 can include corresponding service aggregator entities. Functionality of the service aggregators 124, discussed in further detail herein, can be realized using one or more computer systems 108, for example. The one or more service channel makers 126 can include corresponding service channel maker entities. Functionality of the service channel makers 126, discussed in further detail herein, can be realized using one or more computer systems 108, for example. The one or more service hosters 128 can include corresponding service hoster entities. Functionality of the service hosters 128, discussed in further detail herein, can be realized using one or more computer systems 108, for example. The one or more service gateways 128 can include corresponding service gateway entities. Functionality of the service gateways 128, discussed in further detail herein, can be realized using one or more computer systems 108, for example.

Figure 2:
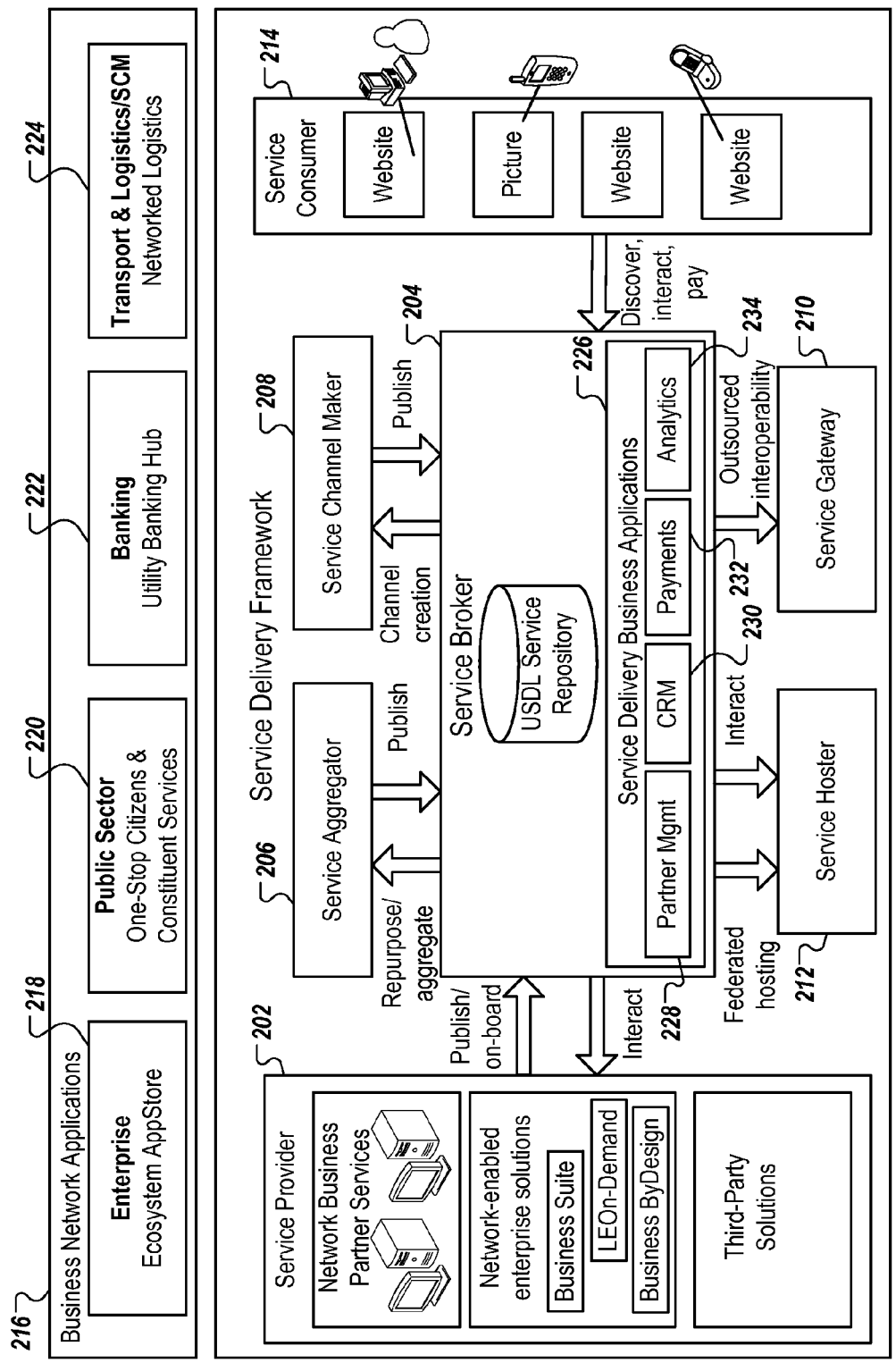
FIG. 2 is a block diagram of an example SDF.

FIG. 2 is a block diagram of an example SDF 200. The SDF 200 supports a diversity of provisioning partners as seen through different roles. In some implementations, the roles include service provider 202, service broker 204, and service aggregator 206. The SDF 200 further includes service channel maker 208, service gateway 210, service hoster 212 and service consumer 214. Different provisioning partners can use particular platform functionality dedicated for their service provisioning niches, as discussed in further detail below. The functionality offered through the SDF roles combines technical capabilities (e.g. service composition tools, service repository, service adaptation and runtime environment, network convergence) with business functionality (e.g. customer relations management (CRM), payments), for supporting diversity of service delivery. Service delivery can be drawn from a foundation layer of components accessed through a service-oriented architecture (SOA) enabled business process platform.

In some implementations, an architectural strategy for the SDF 200 recognizes that industry-specific applications 216 may be needed for business networks operating in different industries. Example applications that apply to industry-specific business networks (e.g., eGovernment platforms for one-stop citizens and constituent services) can provide user interfaces (UIs) and logic that, while coded against a generic SDF layer, are specific to particular domains. Example applications can include enterprise applications 218, public sector applications 220, banking applications 222, and transport and logistics applications 224. In some implementations, the applications can be separately deployed as on-premise installations for customers. In some implementations, the applications can be run as on-demand for several customers. Because a variety of domains are targeted, the SDF 200 supports a diversity of services and a diversity of consumption modes.

The service provider 202 supports partners that hold governance and operational responsibility for services through their business operations, business processes, and organizational units, as well as systems and other implementation artifacts. Each service provider 202 provides the dedicated tooling to engineer, expose and interface services, whether from scratch or from existing applications. For example, the service provider 202 supports companies service-enabling their applications by allowing the functional dependencies of applications to be visualized, analyzed for coupling and cohesion, and assessed for the costs and feasibility of a service interface layer. For example, representational state transfer (REST) style interfacing can be introduced as a layer over applications that are difficult to decouple. As another example, Web service description language (WSDL) interfaces can be generated for parts of applications that can be decoupled.

Each service provider 202 exposes services to a business network so that the services can be accessed without compromise to the mechanisms put in place by providers for service delivery. For example, a service provider should be able to publish a service to a third-party broker, while still requiring that the service run through the current hosting environment and be interacted with through a secure gateway. Some service providers may loosen constraints to access by allowing services to be re-hosted onto a third-party cloud, or downloaded and run in a service consumer's environment. In such a case, where the service is accessed through a third-party, the service provider 202 can ensure that the service is comprehensively described, at least for the benefit of service consumers 214. Such descriptions can include, for example, service ownership, functional descriptions, dependencies on other services, pricing, and consumer rights, penalties and obligations in terms of service performance, exceptions, information disclosure and other legal aspects. For services related in wider business contexts, domain-specific semantic descriptions, vertical industry standards and other documents containing service-related information (e.g., policy, legislation and best practices documents) are also useful to enhance service discovery and consumer comprehension of services. Such comprehensive descriptions can be linked to service descriptions and can be used during service discovery and access through unstructured search techniques.

Each service provider 202 interacts with the service broker 204 to publish, or on-board service details so that they can be accessed through the service broker 204. Example service details can include descriptions, execution artifacts and the like. As discussed in further detail herein, the service broker 204 is the central point of service access within the SDF 200. Each service provider 202 supports provider environments so that the services they host can be integrated with the service broker 204 for required inbound and outbound run-time interactions. The service providers 202 allow deployment of standard provider interfaces in provider environments. In this manner, interactions from the service broker 204 are guarded against security risks and convoluted logic of hosted service applications. Further, service providers 202 have well-defined and allowable operations exposed to them for interacting with the service broker 204.

The service broker 204 supports brokerage agencies that specialize in exposing services from diverse service providers 202 into new markets, matching consumer requests with capabilities of services advertised through the service broker 204. These brokerage agencies manage the "front-desk" delivery of services to consumers, without assuming "back-office" responsibility. Although services are accessed through the service broker 204, execution of the core parts of the services resides elsewhere in a hosted environment. The benefits for service providers 202 lie in reduced costs from outsourced delivery as well as exposure to new markets created by the service broker 204. The service broker 204 can enhance consumer pull through cost-offsets of advertisers, market analysts and other entities that benefit from making their businesses visible through other services.

The service broker 204 is central to the SDF 200 and is used to expose services from the service providers 202. The services can be on-boarded and delivered through the service delivery functionality of the service broker. Example service delivery functionality includes run-time service access environment, billing/invoicing, and metering. Services consumed through end users or applications, or services offered in a business network through intermediaries like cloud providers and B2B gateways, can each be published in the service broker 204. Third-parties can extend and repurpose services through the service broker 204. For example, a service aggregator 206 can use the directory facilities of the service broker 204 to discover and make use of services through design-time tooling, as discussed in further detail below. Ultimately service delivery is managed through the service broker 204 when services are accessed at run-time by service consumers 214. As discussed in further detail herein, example service consumers 214 can include end users, applications, and business processes. In short, the service broker 204 provides a directory and delivery resource for service access.

To support different needs, the service broker enables service providers 202 to specify different delivery models. The delivery models can constrain the way a service is accessed at run-time. Based on delivery needs, the service broker 204 generates the delivery logic, alleviating service providers 202 with the burden of developing and maintaining delivery logic. Example delivery models can include offline delivery, download delivery, reference delivery and mediated delivery. Offline delivery can correspond to ordering professional, human services without any run-time execution, and download delivery can correspond to downloading services to run on a client environment. Reference delivery can correspond to direct access to service endpoints in their backend environments, and mediated delivery can correspond to managed access for individual service steps through an intermediary. The service broker 204 is also equipped with service delivery business applications 226 to support service delivery on a business level. Example service delivery applications 226 can include a partner management application 228, a customer relationship management (CRM) application 230, a payments application 232 and an analytics application 234.

The service hoster 212 enables the various infrastructure services in cloud environments to be leveraged as part of provisioning an application in a business network. By way of non-limiting example, enterprise resource planning (ERP) suites can include certain types of services that can be re-hosted from their on-premise environments to cloud-based, on-demand environments. In this manner, such services could attract new users at much lower cost, without the overhead of requiring access to large application back-ends. As one example, a business network could expand sales lines by allowing small and medium enterprises (SMEs) to access a low-cost, cloud-based order-to-cash service that is integrated with on-premise ERP systems of larger companies.

A service can be automatically deployed onto a specific cloud using an interface provided by the service hoster 212. By providing a generic interface for infrastructure services, the service hoster 212 opens up the possibility to access a plurality of cloud providers through the same service hoster interface. This can be significant for business networks, because cloud services are highly commoditized with slim margins and are subject to business volatility. The service hoster 212 offers business networks partners the possibility to shift cloud providers efficiently, avoiding cloud "lock-in." Cloud services exposed to a business network can plug-in to the service hoster 212 and can be advertised through the service broker 212. When a service is to be hosted, the service broker 204 can match hosting requirements with cloud services that have the required virtual machines. Example hosting requirements can include platform service requirements and operating system requirements. The service broker 204 performs the matching and lists candidate cloud services for a user. Example user can include a service provider requiring hosting as a part of exposing a service offer in a business network, or a service consumer negotiating hosting options/costs when a service is ordered. To deploy a service into the selected cloud service of choice, the service hoster's virtualization management interface allows for interaction with specific cloud services. Once hosted, the cloud service may be monitored for performance and reliability through the service hoster interface. Monitoring information can be streamed through this interface to the service provider 202.

The service gateway 210 supports agencies in selecting a choice of solutions that provide an economies-of-scale, B2B interoperability, as a service, for their applications. Different B2B gateways and integrators have emerged for providing a rich variety of vertical B2B industry standards (e.g. PIDX, VICS) for which they provide design-time business message mapping as well as run-time message store-forward and message translation from required to proprietary interfaces of applications. This is beneficial when services are to be exposed on a business network so that they can be accessed by different partners. When a service provider exposes a service onto a business network, different service versions can be created. The different services can have corresponding interfaces that enable interactions with different message standards of the partners that are allowed to interact with the service.

Distinct as well as common message standards are supported by different B2B gateway providers. The service gateway enables a number of B2B gateways to be registered, so that their services can be accessed through a generic interface. The B2B gateway services are advertised through the service broker 204, allowing service providers 202 to search for candidate gateway services for interface adaptation to particular message standards. Key differentiators are the different pricing models, different B2B communities engaging in their hubs, and different quality of services. Some gateways are evolving into suite solutions, providing common masterdata and reference business processes in particular industries. Such gateways offer greater value for interoperability, because interoperability occurs through a reference business process context. For design-time mapping, the service hoster 212 provides model-based tooling for adapting services, regardless of which B2B gateway provider is being used. The tooling supports automated schema matching, user-specified service-to-service associations on message type and data type levels, and automatic adaptation generation.

For run-time adaptation, B2B gateways address robustness of interactions through different mechanisms (e.g., by supporting integrity checking of service invocations (e.g., whether an action is allowed on a service given its current state), message correlation, fan-out/fan-in invocations (e.g., an external invocation translate to a number of services calls in different orders) and contingency handling for service invocation failures. Like the interactions between the service broker 204 and the service hoster 212, abstract interfaces are offered for engaging, interoperating and monitoring these sorts of functions across the gateway services registered with the service gateway 210.

Service aggregators 206 select services from the service broker 204 for aggregating and repurposing the services to create a new service, and essentially, a new product offering. The service aggregator 206 on-boards and deploys this new service to the service broker 204. Further, the service aggregator 206 can drive new channels from the aggregated service, targeting specialized sectors within the financial services industry, for example.

The service aggregator 206 supports domain specialists and third-parties in aggregating services for new and unforeseen opportunities and needs. In some implementations, services may be integrated into corporate solutions, creating greater value for its users not otherwise available in their applications. In some implementations, services can be aggregated as value-added, reusable services made available for wider use by business network users. In either case, the service aggregator 206 provides dedicated tooling for aggregating services at different levels (e.g., UI, service operation, business process or business object levels). Best-of-breed service aggregation tooling and techniques can be exploited through the service aggregator 206.

Service aggregators 206 are similar to service providers 202, however, there is an important difference. Service aggregators 206 do not necessarily own all of the services that they aggregate. Instead, a service aggregator 206 can obtain custodial rights from service providers 202, for example, to repurpose services, subject to usage context, cost, trust and other factors. In some implementations, and despite new aggregated services being created, constituent services can execute within their existing environments and arrangements. In such implementations, and even though aggregated, a service can continue to be accessed through the service broker 204 based on a delivery model. The SDF 200 supports service-level agreement support through its different roles so that service providers and aggregators can understand the constraints and risks when provisioning services in different situations, including aggregation of services. The service aggregator 206 provides pure design-time tooling functionality. The service aggregator 206 interacts with the service broker 204 for discovery of services to be aggregated and for publishing aggregated services for network partners to use. The service aggregator 206 also interacts with service consumers 214 when services are consumed into existing applications.

The service channel maker 208 supports agencies in creating outlets through which services are consumed. Channels, in a broad sense, are resources, such as Web sites/portals, mobile channels and work centers, through which services are accessed by end users. Example channels can include Internet Banking, Mobile Banking and Retail Banking, respectively. The mode of access is governed by technical channels like the Web, mobile, and voice response.

The notion of channeling has obvious resonance with service brokerage. Virtually all the prominent examples of Web-based brokers expose services for direct consumption and can also be seen as channels. The SDF 200 separates designations of the service channel and the service broker 204 addresses a further level of flexibility for market penetration of services. Service channels are points of service consumption, while the service broker 204 enables accessing of services situated between channels and hosting environments where the core parts of service reside. This separation enables different service UIs and channels to be created. Different channels can be created for services registered through the same service broker 204. The SDF 200, in other words, enables consolidation of service discovery and access through the service broker 204 and independent consumption points through the service channel maker. This is particularly useful for mainstream verticals like the public sector dedicating whole-of-government resources for service discovery and access, but requiring a variety of channels for its different and emerging audiences.

The creation of a channel involves selection of services consumed through the channel, constraining which service operations are to be used, what business constraints apply (e.g. availability constraints), and how the output of an operation should be displayed (forms template) in the channel. By way of non-limiting example, and considering the structure of a Web page, service operations together with text blocks, widgets, images, tables and the like, would be selected into different parts of the page. Different service forms or outputs presented on the same page may require data field correlations. Web authoring applied specifically for services (e.g. requiring that service output be equivalently represented as text) can be supported through the service channel maker 208. Multi-modal interactions are also provided, featuring integrated conventional, spatial and voice interactions.

The service channel maker 208 interacts with the service broker 204 for discovery of services during the process of creating or updating channel specifications as well as for storing channel specifications and channeled service constraints back in the service broker 204. Channels can be discovered through the service broker 204 and allocated through a service consumer 214 for usage through designated users/groups in the business network.

The service consumer 214 completes the service supply chain, effectively fostered by the SDF 200. Through the service consumer 214, parties can manage the "last mile" integration where services are consumed through different environments. This involves the allocation of resources consuming services to consumer environments in which they operate and the interfacing of consumer environments so that the services required can be accessed at run-time in a secure and reliable way.

As discussed above, the resources that consume services are either explicit channels or applications that have services integrated ("hard-wired" into code) or accessible (through a discover/access interface). The service channel maker 208 and the service aggregator 206 support the processes of design-time integration of channels and applications, respectively. Because the allocation of applications in organizations is a specialized consideration controlled through administration systems, the service consumer 214 allocates channels in consumer environments.

The service consumer 214 supports consumer environments so that the services they require are integrated with the service broker 204 through inbound and outbound run-time interactions. As discussed above, the service broker 204 enables services to be accessed through different delivery models. Interfaces are provided on remote consumer environments so that applications running in the environments have well-defined operations that allow interactions with the service broker 204. The interfaces also ensure that invocations from the service broker 204 are free from security risks and application-specific logic when interacting with consumer environments.

FIGS. 3A-3G illustrate example SDF modules that can be implemented in accordance with the present disclosure. As used herein, the term module can refer to one or more software programs that receive input data, process the input data to generate output data, and provide the output data in accordance with functionality described herein. In some implementations, the modules can include one or more sub-modules that operate in concert to provide the functionality discussed herein. Each module and/or sub-module can be executed using one or more computing devices. For example, and referring again to FIG. 1, each module and/or sub-modules can be executed by one or more of the client computing device 102 and the computer systems 108.

Figure 3A:
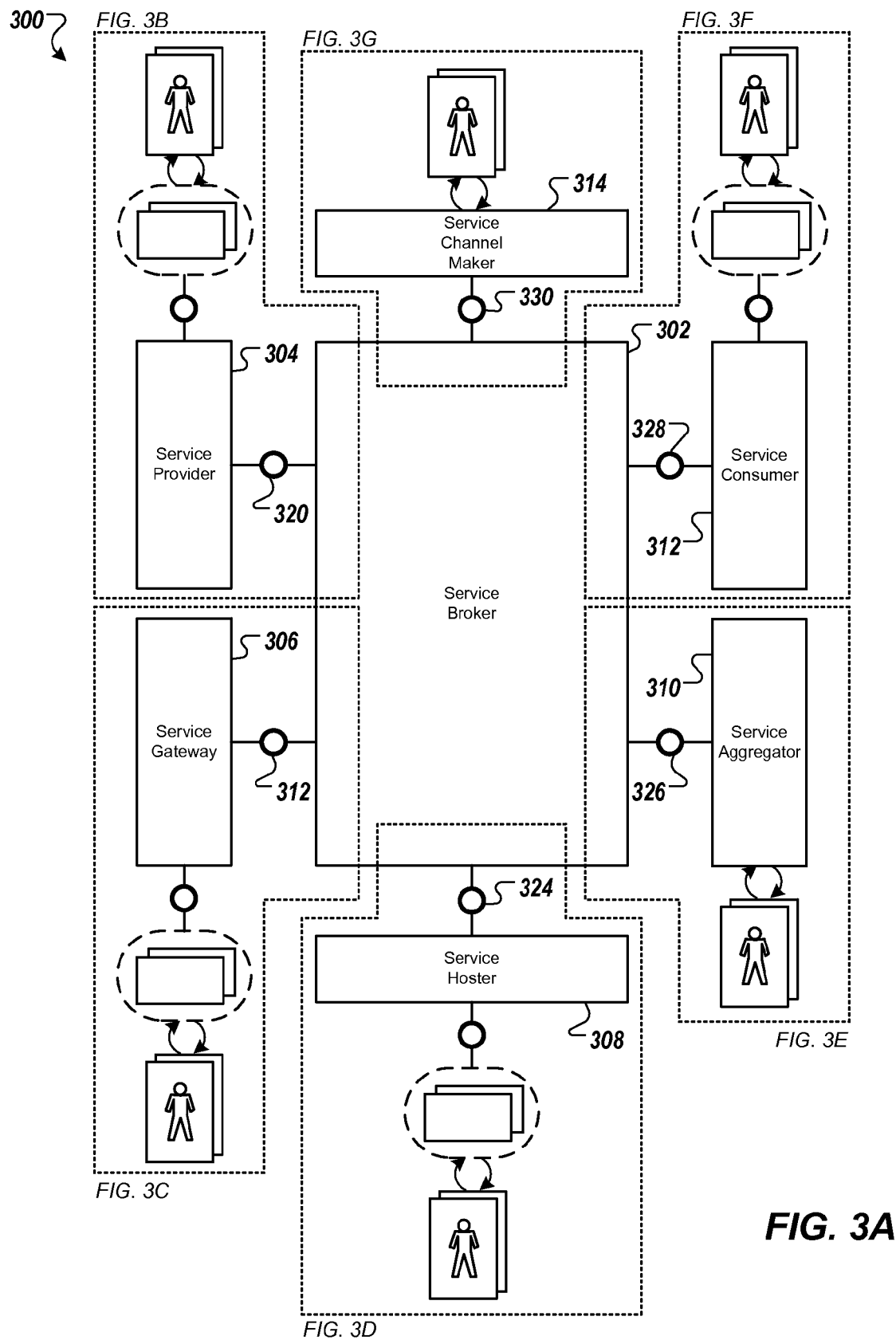

With particular reference to FIG. 3A, an example module architecture 300 is depicted. The example module architecture 300 corresponds to implementations of the SDF, discussed herein, and includes a service broker module 302, one or more service provider modules 304, one or more service gateway modules 306, one or more service hoster modules 308, one or more service aggregator modules 310, one or more service consumer modules 312, and one or more service channel maker module 314.

The service broker module 302 can include one or more modules and/or sub-modules and that can be executed using one or more computing devices (e.g., computer system 108 of FIG. 1) communicates with each of the modules 304, 306, 308, 310, 312 and 314 over one or more networks (e.g., the network 110 of FIG. 1). The service broker module 302 can communicate with the service provider module 304 through one or more application program interfaces (APIs) 320, discussed in further detail herein. The service broker module 302 can communicate with the service gateway module 306 through one or more APIs 322, discussed in further detail herein. The service broker module 302 can communicate with the service hoster module 308 through one or more APIs 324, discussed in further detail herein. The service broker module 302 can communicate with the service aggregator module 310 through one or more APIs 326, discussed in further detail herein. The service broker module 302 can communicate with the service consumer module 312 through one or more APIs 328, discussed in further detail herein. The service broker module 302 can communicate with the service channel maker module 314 through one or more APIs 330, discussed in further detail herein.

Figure 3B:
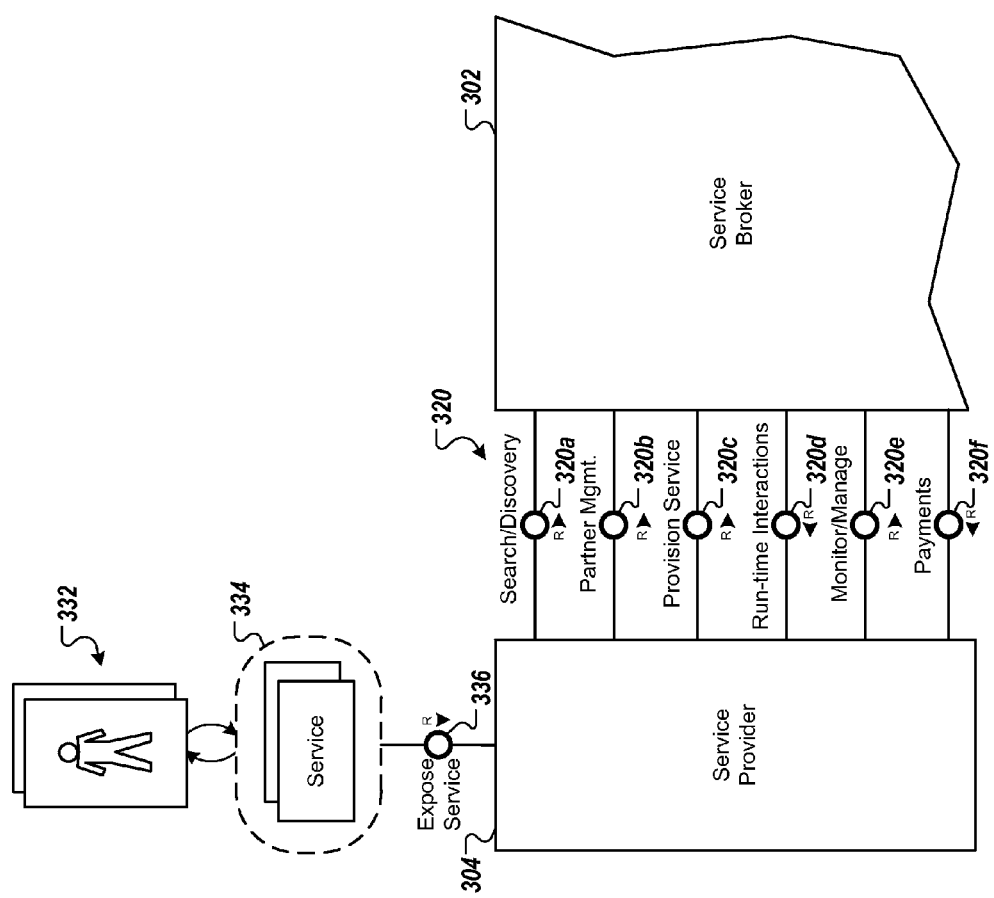

Referring now to FIG. 3B, interaction between the service broker module 302 and the service provider module 304 will be discussed. The service provider module 304 can be associated with one or more service provider entities 332 that provide one or more services 334. In some implementations, the one or more services 334 can be provided as software applications that are executed using one or more computer systems (e.g., computer system 108 of FIG. 1). The one or more services 334 can communicate with the service provider module 304 through one or more APIs 336. The illustrated API can include an expose service API that enables the service provider 332 to expose, or otherwise publish the one or more services for consumption by a service consumer through the service broker.

The service broker module 302 communicates with the service provider module 304 through the APIs 320. In the example of FIG. 3B, the APIs 320 include a search/discovery API 320a, a partner management API 320b, a provision service API 320c, a run-time interactions API 320d, a monitor/manage API 320e and a payments API 320f. Each API enables communication between the service broker module 302 and the service provider module 304 to realize functionality, as discussed in further detail herein. As one example, the search/discovery API 320a can be used to enable publication and searching of services. For example, a service can be published to a catalogue of services maintained by the service broker module 302, and the service can be searched for and discovered by a service consumer through the service broker module 302. As another example, the monitor/manage API 320e enables a service provider to monitor and manage usage of a service and/or the performance of one or more partners (e.g., a service hoster). As another example, the payments API 320f facilitates distribution of payments for services that are consumed, as discussed in further detail below.

Figure 3C:
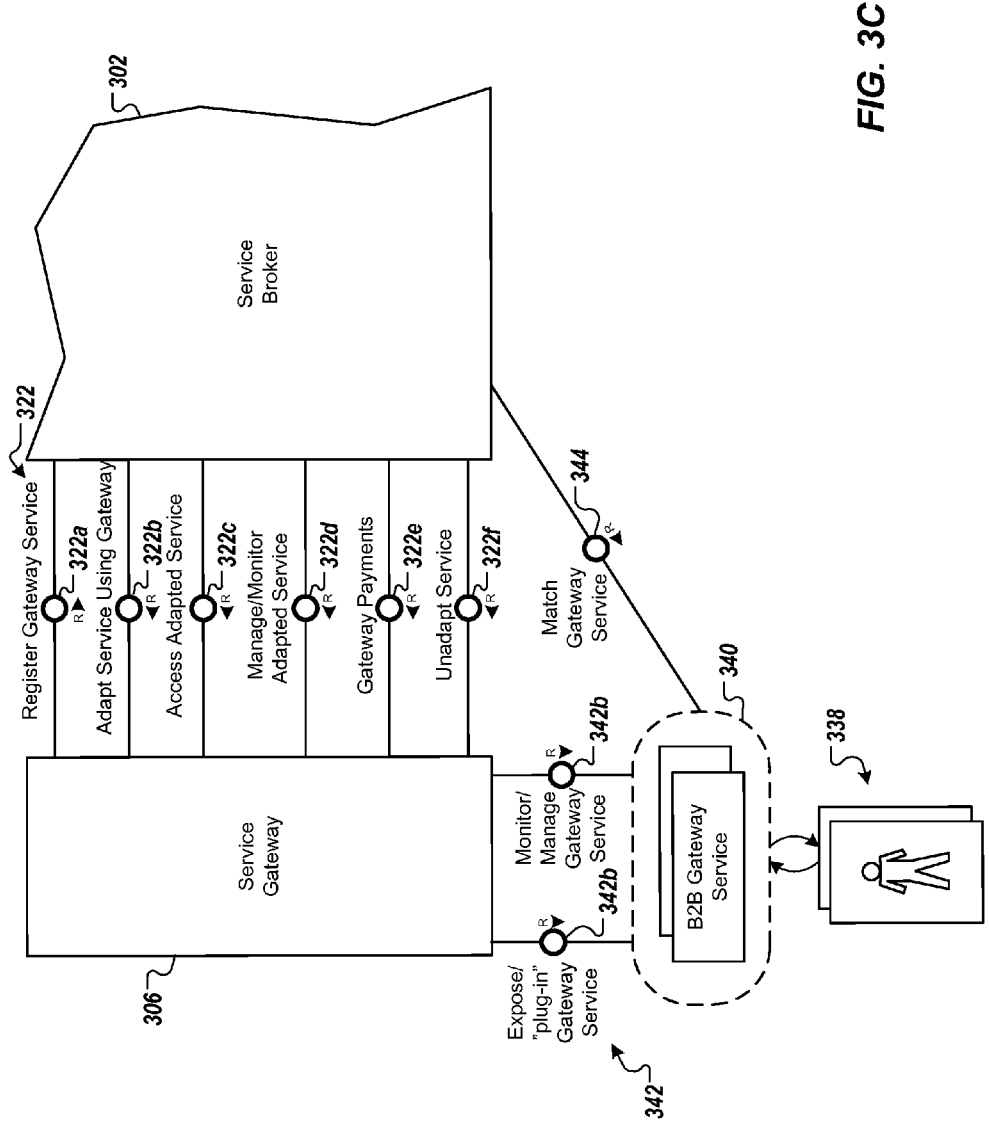

Referring now to FIG. 3C, interaction between the service broker module 302 and the service gateway module 306 will be discussed. The service gateway module 306 can be associated with one or more service gateway entities 338 that provide one or more B2B gateway services 340. In some implementations, the one or more B2B gateway services 340 can be provided as software applications that are executed using one or more computer systems (e.g., computer system 108 of FIG. 1). The one or more B2B gateway services 340 can communicate with the service gateway module 306 through one or more APIs 342. The illustrated APIs 342 can include an expose/"plug-in" gateway service API 342a that enables the gateway service provider 338 to expose, or otherwise publish the one or more gateway services for use by one or more partners through the service broker. The illustrated APIs 342 also include a monitor/manage gateway service API 342b that enables the gateway service provider 338 to monitor and manage use of the one or more gateway services by one or more partners in the SDF. In some implementations, the service broker module 302 can communicate directly with one or more of the B2B gateway services 340 through a match gateway service API 344.

The service broker module 302 communicates with the service gateway module 304 through the APIs 322. In the example of FIG. 3C, the APIs 322 include a register gateway service API 322a, an adapt service using gateway API 322b, an access adapted service API 322c, a manage/monitor adapted service API 322d, a gateway payments API 320e and an unadapt service API 322f. Each API enables communication between the service broker module 302 and the service gateway module 306 to realize functionality, as discussed in further detail herein. As one example, the register gateway service API 322a can be used to register the B2B gateway services 340 with the service broker to enable one or more partners in the SDF to find and access the B2B gateway services 340. As another example, the gateway payments API 322f facilitates distribution of payments for gateway services that are used, as discussed in further detail below.

Figure 3D:
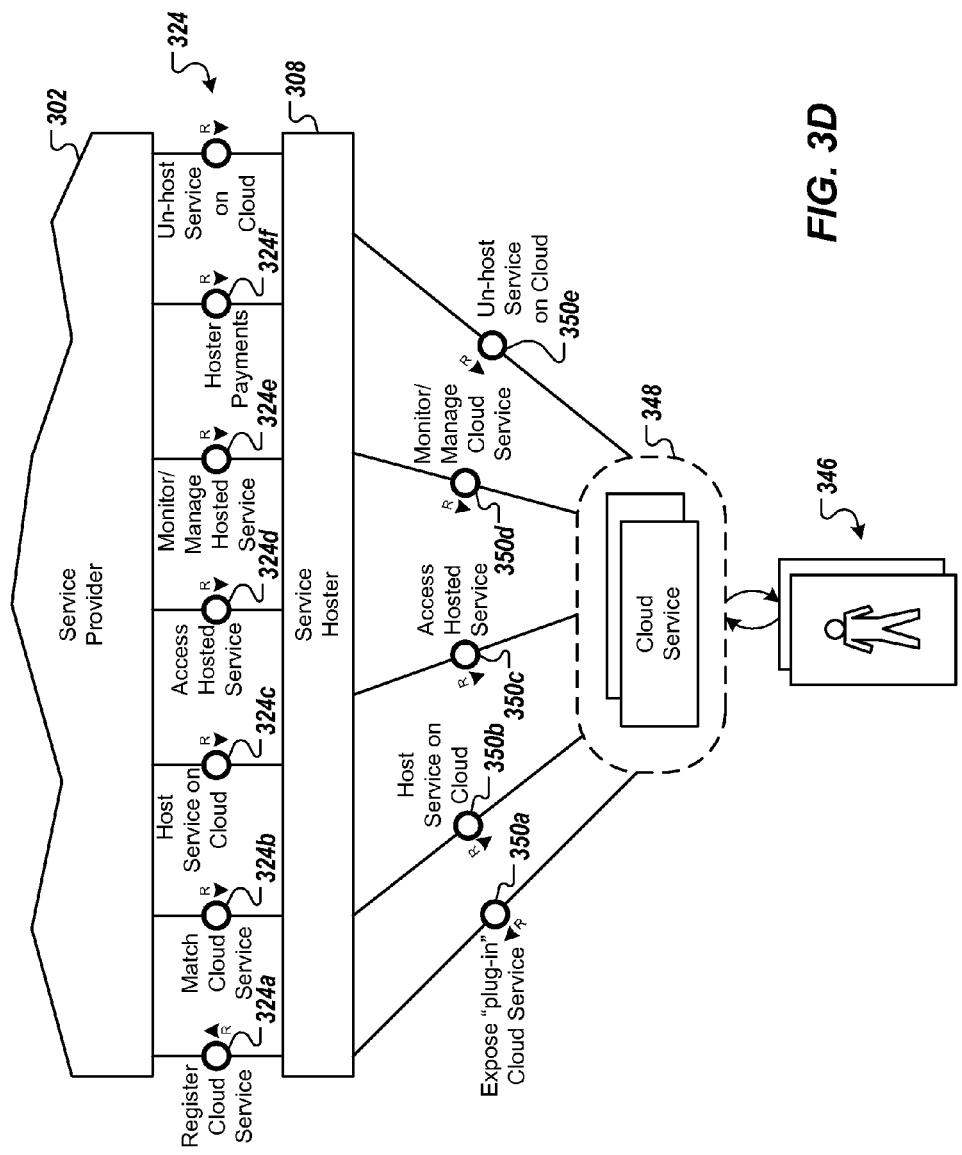

Referring now to FIG. 3D, interaction between the service broker module 302 and the service hoster module 308 will be discussed. The service hoster module 306 can be associated with one or more service hoster entities 346 that provide one or more cloud services 348. In some implementations, the one or more cloud services 348 can include hosting one or more services of one or more service providers in a cloud computing environment using one or more computer systems (e.g., computer system 108 of FIG. 1). The one or more cloud services 348 can communicate with the service hoster module 308 through one or more APIs 350. The example APIs 350 in FIG. 3D include an expose/"plug-in" cloud service API 350a, a host service on cloud API 350b, an access hosted service API 350c, a monitor/manage cloud service API 350d and an un-host service on cloud API 350e.

The service broker module 302 communicates with the service hoster module 308 through the APIs 324. In the example of FIG. 3D, the APIs 324 include a register cloud service API 324a, a match cloud service API 324b, a host service on cloud API 324c, an access hosted service API 324d, a monitor/manage hosted service API 324e, a hoster payments API 324f, and an un-host service on cloud API 324g. Each API enables communication between the service broker module 302 and the service hoster module 308 to realize functionality, as discussed in further detail herein. As one example, the register cloud service API 324a enable one or more hoster entities 346 to register one or more of the cloud services 348 with the service broker to enable one or more partners in the SDF to find and access the cloud services 348. As another example, the hoster payments API 324f facilitates distribution of payments for hoster services that are used, as discussed in further detail below.

Figure 3E:
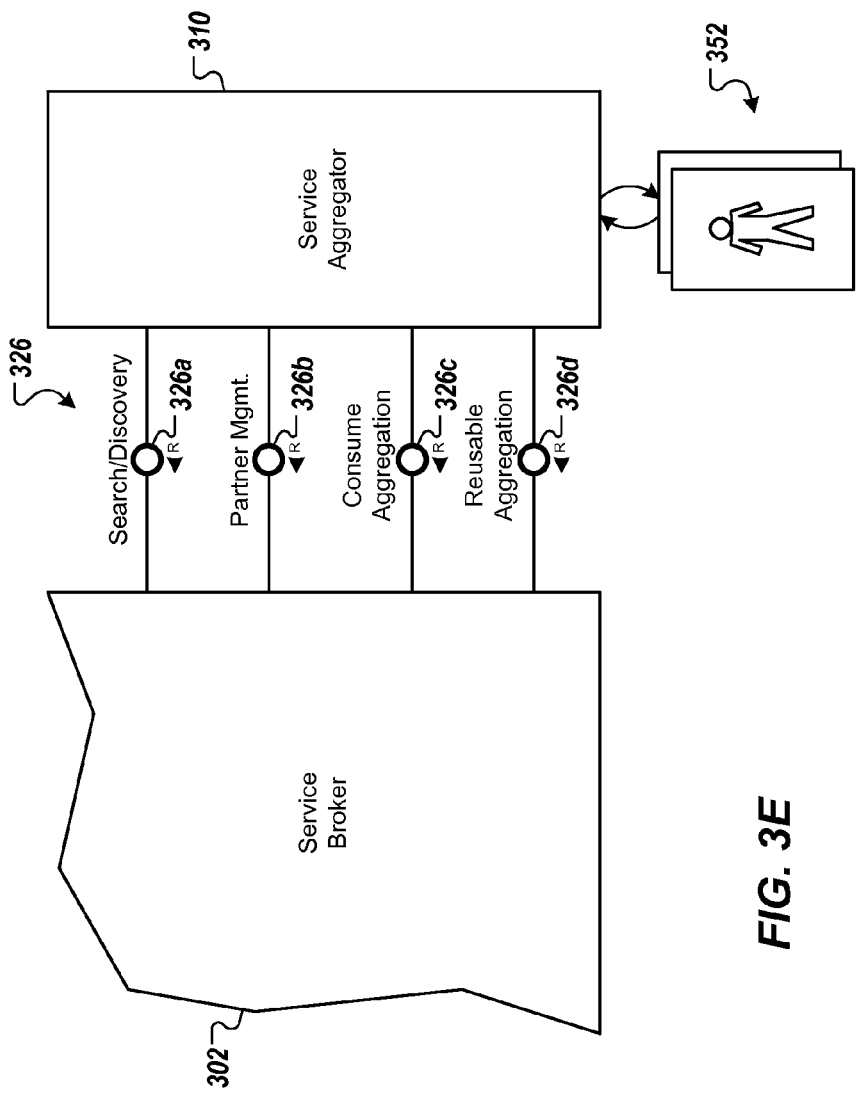

Referring now to FIG. 3E, interaction between the service broker module 302 and the service aggregator module 310 will be discussed. The service aggregator module 310 can be associated with one or more service aggregator entities 352 that can aggregate one or more services provided by one or more service providers to compose an aggregate service, as discussed in further detail herein.

The service broker module 302 communicates with the service aggregator module 310 through the APIs 326. In the example of FIG. 3E, the APIs 326 include a search/discovery API 326a, a partner management API 326b, a consume aggregation API 326c, and a reusable aggregation API 326d. For example, the search/discovery API 326a enables publication and searching of aggregated services. For example, an aggregated service can be published to a catalogue of services maintained by the service broker module 302, and the aggregated service can be searched for and discovered by a service consumer through the service broker module 302.

Referring now to FIG. 3F, interaction between the service broker module 302 and the service consumer module 312 will be discussed. The service consumer module 312 can be associated with one or more service consumer entities 360 that consume one or more services (e.g., services 334 of FIG. 1) provided by a service provider. In some implementations, the service consumer entity can include a user (e.g., user 104 of FIG. 1) and/or one or more consuming applications 362. In some implementations, the one or more consuming applications 362 can be provided as software applications that are executed using one or more computer systems (e.g., computing device 102 and/or computer system 108 of FIG. 1). The one or more consuming applications 362 can communicate with the service consumer module 312 through one or more APIs 364. The illustrated API can include a user service API 362 that enable the consumer entities 360 to consume services through the service broker.

The service broker module 302 communicates with the service consumer module 312 through the APIs 328. In the example of FIG. 3F, the APIs 328 include a service consumer management API 328a, a service/channel deployment on consumer API 328b, a run-time search/discovery module 328c, a run-time service interactions API 328d, and a monitor/manage service API 328e. As one example, the run-time search/discovery API 328c enables a service consumer to search for services provide in the service catalogue of the service broker.

Referring now to FIG. 3G, interaction between the service broker module 302 and the service channel maker module 314 will be discussed. The service channel maker module 314 can be associated with one or more service channel maker entities 370 that can create one or more service channels, through which one or more services can be interacted with, or consumed, as discussed in further detail herein. The service broker module 302 communicates with the service channel maker module 314 through the APIs 330. In the example of FIG. 3G, the APIs 330 include a search/discovery API 330a, a partner management API 330b, a UI creation API 330c, a channel creation API 330d, a monitor/manage channel API 330e, a channel partner payments API 330f, and a channel de-commission API 330g. For example, the search/discovery API 330a enables publication and searching of service channels, through which one or more services can be accessed and interacted with. As another example, the channel partner payments API 330f facilitates distribution of payments for channels that are used for service consumption, as discussed in further detail below. As another example, the channel de-commission API 330g enables a service channel maker to de-commission one or more service channels, making the one or more service channels unavailable for use in accessing and interacting with one or more services.

The service broker, discussed in further detail herein, supports governance and community fostering through the service broker module 302. Service brokerage is applicable to a wide range of partners relying on a service broker organization and resources to allow for their services to be exposed. Further, the service broker supports a complex intermediation service. The service broker module 302 enables partners to register services with automatic assistance for consistency and completeness checking. Example services include software services that can be ordered through the service broker (e.g., enterprise software-as-a-service (SaaS); software services utilized by the service broker (e.g., a payment engine), and business services ordered through the service broker involving software interactions and business interactions (e.g. property conveyance involving site inspections). Registrations entail different degrees of information depending on the degree of service delivery support required through the service broker.

In some implementations, the service broker module 302 can list services as catalogue items. In some implementations, services entail execution components residing in an external host. Consequently, the service broker module 302 can identify required references to services. In some implementations, services can require mediation through the service broker. Consequently, the service broker module 302 provides and structures service interaction parts and "backend" service invocations to facilitate mediation. In some implementations, services can be accessed through the service broker (e.g., downloadable content services). During registration, the different service needs is supported. For example, the service broker module 302 can provide support for uploads of service packages from partners, provision of descriptive information (e.g., functional descriptions, obligations of access), and the like. Service offers can be created and registered out of previously registered services. Services that are targeted for consumption entail particular access constraints (e.g., availability, pricing, penalties).

As part of registration and deployment of a service, the service broker module 302 enables the creation of service contracts between a broker and partner(s) in the provisioning of one or more particular services. Service contracts may be required for the different types of services (e.g., platform services, business services) and situations of service registration (e.g., creation of service offers). Conditions expressed in service contracts can be used to monitor the performance of both a broker and the partner(s). In some implementations, a further contract may be created for service consumption, based on negotiated conditions of delivery between a consumer and the provider. Consistency between all contracts impacting service delivery, from partner contracts to service provisioning contracts to service consumer contracts can be ensured.

In some implementations, and as part of registration and deployment of services, the service broker module 302 enables execution testing for operational conformance between the service broker and service implementation environments. In some implementations, the service broker module 302 enables a service consumer to use a service in a trial, "test-drive" fashion. This includes being able to gain a clear introduction to the execution steps of the service including required points of user interaction and logical progress (e.g., "from-here-what-your-future-execution-path-involves"). Service trials can also include executing a service without it being formally committed in terms of business impact. Test-usage can enable seamless transition to formally committed execution.

In some implementations, the service broker provides for descriptors out of particular taxonomies (ontologies) to be used for describing services. In some cases, this may be required when describing service offers to particular markets, channels, domains and, on an instance level, run-time negotiations and choices made during service ordering. In some implementations, the service broker module 302 provides for service descriptions to be extended as semantics related to the service. The semantics can be determined for data sources within the environment, notably unstructured sources (e.g., textual documents).

In some implementations, the service broker module enables descriptions of service coordination steps to be configured such that they can be delivered within the context the service broker's operations. Different degrees of service delivery support through the service broker can be reflected in the composition: service factory, service mediation with service steps orchestrated through the broker, bundles, and service downloads. One challenge is the mediation case, where service coordination steps are suitably described through business process models and involve invocations to operations, linked to "backend" service implementations. Operations undertaken through the service broker can entail service delivery (e.g., payment points, CRM, service tracking and usage metering). The brokered service model, as such, can include service broker and "backend" service operations. Configurations can be verified for correctness. In some implementations, business process modeling notation (BPMN) can be used for description and configuration of service coordination steps.

In some implementations, CRM applications may facilitate the capture, consolidation, analysis and enterprise-wide dissemination of data from existing and potential customers. The objective of CRM is to better understand customers and anticipate their interest in an enterprise's products and/or services. This enables organizations to anticipate customer needs and create effective strategies for service delivery. By enabling agencies to track and record certain information for those customers wishing to opt-in to an enhanced customer relationship. This facilitates anticipation of customer needs, tailoring of service provision for increased speed of delivery, and integration of services across all agencies dealing with the customer.

The service broker module 302 further enables processes concerning interactions with external partners to be described explicitly so that partners can understand what will be entailed through a broker's operations such as partner registrations, service registrations, service ordering and utilization, and problem tracking. The service broker module 302 enables partners to be openly registered and de-registered, subject to governance and other constraints. Further, the service broker module 302 enables contracts with partners to be explicitly captured. In particular, contracts formally establish trust, rewards, suspensions, penalties and other issues related to partner participation to be managed and exposed.

The service broker module 302 supports customer relationship management (CRM), including customer profiling, and monitoring and categorization of customer usage patterns. In this manner, services can be targeted for customers and refactored given changing usage patterns. In some implementations, the service broker module 302 enables community support around different cloud applications. Example cloud applications can include alliance applications, and marketplace applications. This enables community style identification for new services and changes in service delivery to be harnessed through the service broker to provide "wisdom of the crowd." In some implementations, the service broker module 302 enable rating of different aspects of services and their provisioning to be rated by service consumers. In some implementations, partners can be supported in rating their provisioning experience using the SDF.

The dynamic growth of business partnerships and the pressure for global reach and market diversification for growing revenue targets, are driving businesses to expand their networks to better expose services and products, accelerate provisioning through third-parties, and remove barriers to service consumption. The pattern of e-commerce marketplace is one of the most flexible ways of achieving these goals, having transformed goods trading on the Web, and is increasingly being adopted for services, seen through software as a service (SaaS) "Appstore" initiatives. Where marketplaces have been adopted in the corporate sector, as a central directory, exposing services of network partners and allowing these to be consumed by line-of-business users and applications alike, significant revenue and dynamic growth of a business network has followed.

The ability to effectively discover services is paramount given the large number of services from diverse sources and business domains published in business networks. Example business networks can include eGovernment, utility banking hubs, global transport and logistics networks and software "appstores." As discussed herein, the service broker of the SDF is the resource through which services can be exposed so that they can be extended, further provisioned and accessed. There are a variety of situations that require timely identification and match-making of services based on a variety of data sources containing explicit or tacit knowledge of services.

From a service consumer's perspective, discovering services is the initial stage of service access. The objective of service discovery is to determine services that are relevant to the service consumer's needs so that they can be selected, ordered and interacted with. A service consumer may understand his/her need concretely (e.g., the need for a building permit), in which case the discovery steps are targeted. In other cases, the need may not be concretely known, and may only unfold during the steps of discovery. For example, a person may want to build a house and goes through a "research" phase of discovering the various certification steps, paperwork and payments through a combination of private and public services. Because many services are needed in the context of other services, service discovery can often take place while services are executed.

There are distinct parts to discovery that are not always seamless in a service consumer's discovery experience. The first part is knowing where to discover services, whether through business channels (e.g., portals) and technical channels for devices. For self-serve users, this means prior knowledge of the channel, finding the uniform resource locator (URL) through a Web search, automatically connecting to a channel through a device, or being directed from one channel to another. For example, a consumer may need to register a heavy vehicle, which can only be done through specialist channels (e.g., channels having a weighbridge). In this case, the service broker provides a list of business channels through which the service can be accessed.

The next part of discovery is going through a search phase prior to an actual service (targeted by discovery) so that its Web page or form can be accessed. Traditionally, this aspect of discovery involves searching or browsing. Searching is where specific keywords relating to either the subject of the service (e.g., vehicle, car, boat, horse) or relating to the process of the service (e.g., registration, license, certificate, permit) are entered and the system presents a series of ranked candidate matches. The more specific the keywords, the more constrained and accurate the results list will be. Browsing is where a list of topic choices are presented to the user and he/she selects the specific area of interest from this list, which iteratively leads to a more refined list of choices and so on, until specific choices are narrowed down for selection.

The actual discovery mechanism is technical channel (i.e., device) specific. For example, discovery via a Web channel is a process of searching and browsing to find the reference URL for a service Web page. As another example, discovery via an automatic voice response channel is a process of navigating through a voice/tone menu. However, the search is typically conducted over a services descriptions held in a service catalogue that is managed by the service broker. Descriptions enable exposure of sufficient functional information about services. Non-functional attributes can also be provided in the descriptions (e.g., pricing, availability, locality of relevance and delivery, legal obligations, rights and penalties). Structural aspects (e.g., the business objects, operations and message types), together with a consumer model of the service steps, inform service consumers about what is in store when interacting with the services.

Because services are generally members of a "family" of related services, understanding service dependencies enhances service discovery. By way of non-limiting example, a vehicle registration process includes a number of specific services such as initial registration, annual registration renewal, change of details, compulsory third-party insurance and cancellation of registration. These example services are just some of its immediately dependent services. Vehicle registration is also related to driver's license, as dependents of higher level services. These might ultimately be bundled in with a life-event service (e.g., turning 21 years old). A mechanism for finding dependent services within and across a family (e.g., parent, siblings, children, friend services), across different levels of granularity like value-added services bundles and composite services down to elementary or atomic services is provided. Because, service knowledge is dispersed in unstructured or semi-structured documents, pointers to these are also useful for extending the range of discovery.

Ultimately, the quality and currency of service descriptions accessible through the service broker is critical for the effectiveness of discovery. For example, service delivery would be compromised if broken links were to occur. The responsibility for maintaining the references to the service delivery system and the business rules rests with service providers. However, this maintenance is provided within a tight framework of standards and procedures and supported by robust tools that minimize the manual effort required for cataloguing services, uploading these to the service broker and maintaining these over the lifetime of a service.

Another part of service discovery can occur when a service is actually consumed. For example, and in some implementations, a service can be used to capture the requirements of a user in order to determine the exact part, variant, or entire instance of a service that is needed. Examples include questionnaires or spatial (map) navigations that enable users to flexibly capture their service requirements through choices selected against business rules, serving to discover the exact service functionality needed. An example includes a map-based search of a region for a related set of services like camping and recreation bookings. As the user drills down, choices like whether electricity, water supply, showers and pet allowance, are made. This domain/semantic specific search phase can also be responsible for determining the service fee for those services that don't have a fixed fee, taking into account relevant user circumstances such as entitlements and discounts. Although the business rules may include a price schedule, this may be provided for information only. For example, actual price determination can be provided through the general discovery process for fixed prices, and through the domain/semantic discovery process for variable prices.

In some implementations, different parts of services are seamless to reduce the need for users to know about which channels to use and the boundary between general and domain/semantic search. In this manner, service discovery works consistently and seamlessly for different situations.

Service providers and partners also access the discovery functionality of the service broker. In particular, service provider and partner use discovery to support tasks of extending and further provisioning services so that they exploit other services and resources exposed on a business network. Aggregating services into value-added offers can also utilize discovery capabilities (e.g., locating services and understanding their capabilities). However, for provisioning services to resources on the network, additional functionality is provided. In particular, the service broker can match structural descriptions of service delivery operations as part of the "on-boarding" process of the service onto the delivery system of the service broker. If a service provider wishes to re-host a service onto a cloud environment, for example, the service broker can determine which of the cloud services registered and accessible through the service hoster could host the service. This means that the platform and infrastructure dependency needs of the service are matched with the capabilities of cloud services. If a service provider wishes to create a new interface for a service using a B2B standard, for example, B2B gateways registered with the service gateway can be matched by the service broker to support the adaptation requirements for the service without compromising its runtime performance requirements.

In view of the above discussion, the service broker provides keyword-based search/discovery of services and delivery aspects, so that users can discover and match their needs, in different situations, with available services and capabilities for delivery. Searches can be performed over a service catalogue (e.g., provided in a computer-readable storage medium) having generic attributes describing functional, non-functional (e.g., price) and structural aspects (e.g. message types, process model) of services. Results partially or fully matching searches can be provided for display so that users can review the search results, refine the search and select one or more services. Aspects of delivery associated with services can also discoverable. Delivery aspects can include business and technical channels through which services can be interacted with at different phases in their life-cycles, details about partners involved in delivery, the payment process, and the like. This can further include discovery of how services have been used and common questions posed by users when using particular services. For aggregated services, where parts are abstractly specified but not concretely bound, discovery may be recursive. This means that available services in the catalogue that could fulfill these parts are identified.

The service broker further enables search refinement through general and service-specific topic hierarchies. Browse-based discovery, like search-based discovery, is not executed in the context of a specific service. Semantic hierarchies are associated with searches against sets of services. This is the responsibility of service providers. For large or complex semantic hierarchies, suggestions can be made available based on different criteria including choices made historically by users, to make the specification of choices easier.

The service broker further provides search refinement through business rules of a set of services. There are similarities between this and browse-based search discussed above, with the exception that choices against business rules are made and a service could already be executing. Here, the focus is on determining which part or variant of a part is required. Business rule hierarchies are associated with searches against sets of services. This is the responsibility of service providers. For large or complex business rule hierarchies, suggestions should be available based on different criteria including choices made historically by users, to make the specification of choices easier.

In some implementations, the service broker supports discovery and matching needs for partners involved in provisioning services through the SDF. Provisioning can involve brokering, value-added aggregation, cloud hosting, B2B gateway adaptation and channeling. As services are extended for these different provisioning situations, relevant services and resources (e.g., match B2B gateways, clouds, etc.) should be supported.

In some implementations, the service broker enables goals or needs to be matched from an operational context (e.g., a service or application that is being used that needs an additional component). Goals can be provided as a formal representation specifying input/output behavior of services. The formal representations are a richer means of specifying abstract parts of services. Accordingly, service match-making can be simplified based on structural aspects of services for value-added composition and other provisioning needs.

In some implementations, the service broker enables specific service configurations representing particular use cases of the service be automatically identified as part of incomplete search criteria that a consumer has specified. Use cases can be listed and based on the selected one, and a service instance can be configured.

Service authentication and authorization will now be described in further detail. A further distinction for service brokers, as compared to e-commerce goods marketplaces, is authentication. Goods orders can require that customers identify themselves and provide payment methods and shipping addresses in order to complete procurement processes. Services, however, are not amenable to such a "one size fits all" security strategy. Instead, services involve different degrees of security sensitivity.

Services that freely provide available information do not always require user identification. For such services, anonymous access is acceptable. Highly sensitive services (e.g., such as obtaining a business license or applying for a passport), however, carries major implications for the identity of individual and entities concerning services being accessed. Such services risk identity fraud and other related risks. For these services, users need to be authenticated to the highest possible level of identification, which ensures that the identity of a person is reflected in credentials, nominal details and the like, provided by a user when accessing a service. For other services, the security concern is somewhere in the middle. Such services can require identity details though a certain level of trust is assumed or established elsewhere between the user, service provider and intermediary. Either that or the level of identification is only required for a non-sensitive aspect (e.g., transfer of materials to a billing address.

Customers, web application developers and service developers work as users in different roles (i.e., with different permissions) on the service broker. Each user is connected to one or more identities that can work as the user on the service broker. A user also has a number of payment instruments that can be used to pay or receive payments on the service broker. Depending on the roles in which the works, the user has service offers, service contracts and service instances connected to a respective user profile stored at or accessible by the service broker. The user profile also contains preference data for the diverse environments and tools used by the user. A user can also have a number of open and paid invoices connected to the respective user profile. Each user works with an identity on the service broker. The identity is either provided by the service broker and can be obtained by providing the right email/password combination as authentication information, or it is provided by an external identity provider.

When an authentication component is used by the service broker, the authentication component is used to create identities responsible at the level of service brokerage and not identities for individual agencies. The authentication component also enables a user to connect to the service broker with the user identity using the provided authentication information (e.g., email/password combination).

Customer authentication is the process of validating a person's identity. This can be based on something the individual knows (e.g., password, PIN, signature), something the individual possesses (e.g., key, token, Smart Card), and/or something the individual is (e.g., fingerprint, retina, voice recognition). Customer authentication approaches can fall into the following example categories:

Manual—a trusted agent matching the customer against something they have, i.e. checking customer's photo-ID, or Electronic—matching the customer or something they have or know against a corresponding item in an agency database, i.e. checking a signature against one on file or matching a PKI private key with a public key.

In some implementations, customer authentication is integrated at the consumer session level (i.e., once authenticated to a certain level), such that authentication is valid for subsequent transactions within the consumer session of an equivalent or lower level. If a subsequent transaction within the encounter requires a higher level of authentication, then the customer would need to re-authenticate to that higher level. With regard to re-authentication, customers will need to re-authenticate at each consumer session unless they are only enquiring on an existing transaction in which case quoting the session ID will be sufficient. The business requirements for each service can specify to what logical level of authentication is required. A table of authentication requirements can be provided as:

TABLE

Example Authentication Schedule

| Level | Authentication Requirement |
| --- | --- |
| 0 | No authentication, anonymous customer |
| 1 | No authentication, named customer |
| 2 | 50 point check (e.g., 1 item of photo-ID) |
| 3 | 100 point check (e.g., 2 items of photo-ID) |

Although the table provides a hypothetical authentication requirements schedule, the precise levels can be determined through business process review. It is assumed that customer authentication levels can be codified on a linear scale.

How the logical authentication levels are implemented can depend on the constraints of the technical channel, and whether the service is mediated or self-service. In the case of a mediated transaction, a level 3 authentication requirement (e.g., 100 point check) may be implemented by the service delivery agent sighting sufficient documentation, and then marking a checkbox on the screen.

For business channels that do not support manual authentication, a central customer database can be provided on the service broker, the database holding agency authentication details such as passwords, secret phrases, signatures, or digital certificates (e.g., public keys). Such a central database can also be managed by a lead agency (e.g., Transportation Department, Postal Authority), and the authentication it provides would need to be trusted by all other participating agencies within the SDF.

For use authentication, the service delivery manager should ensure that access to a service meets the required level of authentication for that service. Where services are accessed in the same consumer session and the user identity has been established through the session, the authentication should qualify for other the authentication needs of other services accessed through the session. Repeated authentication per service accessed through the same session can be avoided unless needed by particular services. Ongoing authentication through subsequent sessions can abide by the security requirements of the service. Agents (e.g., persons authorized by the eGovernment network) would have a single sign-on to the service broker. All service providers registered with the service provider would trust the "public" sign-on and allow for backend applications to seamlessly interact with the service broker to allow for service steps to be executed.

In some implementations, trusted service delivery agents need not re-authenticate with each and every backend application. Instead, such agents can be uniquely and securely identified to the service broker, and the agent's access rights to specific services are coordinated through the service broker. Once authenticated with the SDF, agent credentials can be transparently passed to backend systems with each transaction. Agency service delivery systems trust service broker-validated agent electronic credentials rather than requiring agents to re-authenticate.

Agents can be accredited to deliver certain classes of service. The specific determination of service classes and agent accreditation levels is a matter for individual deployments of the SDF. An example range of service classes and agent accreditation levels can be provided as:

Guest—for self-service customers (i.e., no agent);
Non-financial Agent—simple information provision, form completion; and
Cashier Agent—for taking and possibly giving money.

In this example, the selection of Guest level would be transparent to the customer and automatically determined by the business channel. Note that guest level (agent authentication) access to the service broker is different to and does not replace customer authentication, which relates to the legitimacy of a customer undertaking a specific service.

In some implementations, the same agent authentication model applies regardless of whether the agent is an employee of service provider or a third-party partner in a business network. That is, the service broker system does not need to identify and authenticate every agent individually.

In general, the service broker ensures that users (e.g., partners and customers) are identified to the required level to meet the authentication requirements of the services being accessed. The authentication can include management of federated identities. Further, the service broker ensures that partners are authorized to access services to the required level (e.g., read/write) based on the services being accessed.

The service broker further provides service negotiations and ordering. With regard to service negotiations, the service broker provides for negotiations of services or their variable parts based on different criterion (e.g., pricing, partner credibility). Requests for quotes (RFQs) are also supported. With regard to service ordering, the service broker enables services to be ordered either through service discovery, or more directly through a service invocation from an external application or service channel. In some implementations, and based on a service consumer's request, a service instance can be created and interactions with the service enabled corresponding to the service coordinator's configuration. During ordering, some features of a service may be requested while others are ignored. This results in variants of a service being selected and instantiated. Some features should be subject to negotiations, for example, pricing and one of a number of competing service providers may be selected.

Steps executed by the service broker can be tracked. In particular, different degrees of service delivery support through the service broker can be made available (e.g., service factory, delivery mediation, pure catalogue and download, as discussed in further detail herein). In the factory case, references to service are passed to consumers and are valid for a certain period. In some implementations, the service broker charges for the service upfront. In delivery mediation, access to a service is managed through the service broker. For pure catalogues, the services are human-oriented and no executable access is provided. For downloads, the service implementations are downloaded and executed locally on the service consumer's environment (e.g., computing device). Where execution is involved, user interaction steps, service broker operational steps (e.g., payment) and "backend" service calls can be clearly designated. Services can be tracked along logical steps of progression in a service that is meaningful for consumers.

Once a customer (e.g., service consumer) has perused the business rules, progressed through local discovery, and confirmed that they want to proceed with the transaction, the service broker captures specific details relating to that transaction. Example information can include customer name, seniors card entitlement or payment details. Some information may be common across transactions and, from the customer's perspective, this information should only be captured once. Information may be specific to each transaction, in which case the information is of no relevance to the service broker. Such information can be captured at the session level and may be of value to other transactions in that session.

In some implementations, it may be of value to bring up existing customer details on the screen for the customer to confirm before they progress the transaction. Responsibility for this information provision can be assigned to backend agency systems, although customer information may also reside in an opt-in/opt-out central repository. Data elements that are common to a session can be fed into the session environment. An example of this is where the customer just provides partial information (e.g., driver's license number, or a transaction number from a printed invoice). The specific backend system finds the customer's record, retrieves the relevant information, pre-populates any session level items at the same time. In this manner, common elements (e.g., name and address) are made available to any other transactions the customer may want to initiate within the same session.

Exposure of different types of services can be supported by effective third-party intermediaries. The extent of the service logic exposed on the intermediary can be governed by a number of factors including the complexity of the service, the dependence of business object state in hosted environments and the service, and the degree of trust between providers and intermediaries.

In some implementations, service providers have full hosting responsibility for services, migrating existing service applications, business objects and the like onto the hosting environment. The service broker, on the other-hand, functions as a "middle man," connecting services between service consumers and service providers. For short-running services, like widgets and informational services in general, delivery is rather straightforward and services are generally consumed in a single session. However, for services such as business formation, there are multiple interactions with users and these can last for days or months. Consequently, it may not be possible for such services to be entirely consumed in one "log-in" session. Rather, services are accessed through different sessions and their data state needs to be managed. Where the data state is stored depends on the degree of delivery arrangement between the service provider and the service broker.

Where all state concerning the service is retained in the backend service application, the service provider retains full control of service orchestration logic. The service broker provides access to the service. For example, the service broker provides access to the service and may only have further involvement for billing/payments. To enable services to provide managed adaptation as part of service access, interactions go through the service broker before being adapted there and passed to the service applications executed by the service provider(s). However, the state is still contained in backend service applications. Some state information, such as service progress, can be passed back through the service broker, however, the parts of the service at the service broker are largely stateless proxies to backend service applications.

For more sophisticated service delivery, parts of service state and execution artifacts (e.g. some code validation, forms) can be exposed onto the service broker. By providing more detailed orchestration logic for stateful access routing purposes, the service broker can provide business applications in the service for value-added service delivery (e.g., logging consumer choices as part of CRM, managing on-line settlements, fulfilling services including providing asset transfer through transport and logistics services). For stateful services, the service delivery manager can enable users to see activities involved in the lifecycle of the service, to orchestration of individual steps including allowing forms to be filled in, submitted, and determining the relevant actions to be invoked on backend service applications.

In general, the service delivery manager can ensure that instances of services related to individual consumer service orders are managed, for their required degrees of delivery, from address passing handlers, to stateless mediating proxies, to stateful orchestrators capable of business service delivery configuration. Service instances can be managed until they are no longer needed. The service broker can enable configuration of the created instance based on certain requirements (e.g., use of a service in an industry or country). This also influences the service variation used. The service broker can support shared contexts within semantically related services and service bundles. Minimally, shared customer and other partner information including location and billing addresses should be supported.

The service broker can provide process-based service execution. In particular, the service broker can provide a service execution server to support the orchestration of service steps of brokered service models. Further, the service broker supports mediation of operations of interfaces for invocation of "backend" services. The service broker can also support mediation of processes of interfaces for the invocation of "backend" services. The service broker can enable services to be presented in different contexts/devices. Part of the service presentation mediation can include broker-inserted widgets (e.g., advertising, service targeting).

The service broker further provides for service metering and tracking. Given that extended transactions can persist beyond the consumer session during which they were initiated, users are able to inquire, and potentially be notified of the completion status of each transaction they have initiated. This inquiry mode can be supported through any business channel within the life of the session encompassing the transaction. The stages of a transaction can be service specific. The tracking mechanism, however, can report the current status of these stages to the service consumer. The logging component enables service instance execution events to be logged, and logs to be retrieved for subsequent evaluation.

With regard to service logs, the service broker provides for the utilization of services to be logged for the purposes of metering, monitoring, tracking, exception traces, audits and utilization analysis for service re-factoring, and other needs. The service broker can enable services to be efficiently configured for the purposes of metering. Accordingly, "marked" service interactions are logged. Further, the service broker enables service level agreements (SLAs) to be monitored during and after service execution for compliance and dispute resolution. SLAs can be configured so that business subjects of SLAs are seamlessly correlated with systems aspects at different levels of systems configuration.

At least one differentiator for service brokers in their operation of delivering services on behalf of service providers is the collection payments for services. Payments are collected from consumers and disbursed to providers, with a percentage charged as the brokerage fee.

In the case of SDF, there are multiple points of diversifying service provisioning. A service can brokered, aggregated, interfaced though a B2B gateway, cloud hosted, and channeled through the SDF. Each part of provisioning incurs a "line-item" as part of the overall price, either as a percentage out of, or additional sum of, the price of the service. Both the business operation and the platform service play a role in the provisioning (e.g., the channel provider and the service channel maker). Consequently, the prices of both apply in a provisioning step. As the service broker is central to provisioning a service (i.e., the service broker is used to discover, access and provision the service to a well-defined lifecycle), the service broker can provide the point of integrated payments.

In taking up payment collection through a service broker, the scope of the service price implicates the extent of service delivery that the service broker takes on. In e-commerce settings, for example, marketplace brokers facilitate discovery, ordering and access to the service, but they are not responsible for the substantive operations and fulfillment of the service (e.g., in providing access to a service like business formation, brokers do not take over the decision-making and registration responsibility for granting business licenses). A service price in that regard means the price for gaining access to the service (i.e., a charge for using a business registration service, much like a service application fee). This is less than the actual cost that arises as a result of using a service (e.g., the cost of a business license). If a service broker was involved in collecting such substantive costs, then it would be entering into the responsibility of substantive operations of the service (e.g., service settlement). In general, the intent of pricing is typically proportional to the extent of delivery of the service (e.g., a broker may provide access and connection to a service or it may be intimately involved in substantive steps such as settlement). Service providers and the service broker need to carefully understand the scope of service delivery being outsourced to the service broker and be clear about the meaning of pricing commensurate to the agreed upon service delivery functions.

Ultimately, a service consumer incurs the payment of a service. Accordingly, this can be reconciled with the individual prices of the different provisioning partners, so there is no net loss of revenue in the delivery of the service. In a general approach, payments are apportioned to partners out of the collected payments from customers and other credit sources like advertisers.

Service consumers can pay at different stages relative to the usage of a service. Example stages can include payment before a service is used (prepaid), after (postpaid), during (at a business transaction point(s)), unlimited use perpetually, unlimited use subject to a time or usage constraint (e.g., month subscription fees). Payments can be made using different methods (e.g., cash, check, credit card, debit card (EFTPOS), direct debit (direct entry), BPay and rewards (redemption of points)). The differing characteristics and fee rates for the various methods make them respectively more or less attractive for providers to offer, and for customers to use.

In some implementations, services can be broadly categorized as regulatory/non-discretionary (e.g., registrations, permits), and non-regulatory/discretionary (e.g., information or product purchases). Customers are more willing to tolerate less favorable payment methods for regulatory services, and are more likely to access discretionary services, if they can use favorable payment modes (e.g., credit card). Accordingly, regulatory services can be considered lower-risk, because the service provider can simply cancel the registration/license/permit, for example, when a customer defaults on payment, leaving the customer with the legal risk of operating without authorization. Correspondingly, discretionary services, particularly those for anonymous customers, could incur higher risk.

In multi-step, transactional services, different requirements for payments can arise in different steps of services. For example, one step may require the nomination of a payment instrument and its validation, another step may require a partial payment, and, as part of a transaction step, full payment is required.

Payment steps may entail immediate or delayed clearance. Immediate clearance covers directly receipted funds (e.g., cash but not check) as well as verifiable funds transfer (e.g., online verification credit card accounts, agency credit accounts). Delayed clearance includes scenarios where the nominated payment details are later verified (e.g., debit authorized transactions). In cases of verifiable fund transfers, the payee can be assured that the customer will not default on the payment, either because the payee receives the money immediately or the bank will honor the transaction anyway. In delayed clearance cases, there is a degree of risk that the customer will default. The following table provides example payment methods and corresponding categories:

TABLE

Example payment methods and clearance capabilities

| Payment Method | Clearance |
| --- | --- |
| Cash | Immediate—the money is in the till |
| Cheque | Delayed—the cheque takes 3 days to clear |
| Credit Card | Immediate—the money is transferred electronically |
| Debit Card (EFTPOS) | Immediate—the money is transferred electronically |
| Direct Debit (Direct Entry) | Delayed—depends on bank turnaround |
| BPay | Delayed—requires customer to initiate via bank and depends on bank turnaround |

In terms of multiple provisioned services, the pricing structure of a service needs to allow flexible price apportions and particular requirements, including risk mitigation, for payment per apportion. For example, service providers may require that, prior to the transaction phase of a service (e.g., granting a building permit), commitment to full payment must be made by a customer. In such an example, the service is fulfilled only after a receipt has been issued for payment (e.g., a copy of the building permit is sent). A service broker can receive a fixed fee for brokering the service. This fee is factored into the consumer price of the service. A channel partner may offer a version for a particular device, for example, and adds its fixed fee to the consumer price of the service. If the service provider chooses, for example, to host the service on a specific cloud and obtain monitoring information, via the service broker, a separate pricing arrangement can be arranged between the service provider, the service broker and the cloud provider. Unlike the service transaction fee, this fee is based on an on-demand, time-period charge (e.g., a certain amount per month).

The collection of payments from service consumers through the service broker on the one hand, and the remitting and reconciling of payments by the service broker to service providers on the other, entail a number of asynchronous interactions that may not be visible, but which can impact the steps of service delivery. A general flow of steps related to service payments in this setting and how service delivery is impacted from the points of view of service consumer, service broker and service provider is described in further detail below.

An example payment process can involve a plurality of payment related steps, irrespective of payment method. For example, a service consumer interacts with a service mediated between a service broker and service provider, where the backend application of a service is hosted. A confirmation to continue with a payment can be required. The service consumer accepts to continue the transaction with the owed amount. The customer can issue a payment through the nomination of a payment method and specifications of details (e.g., credit card details). In some implementations, the service consumer can be invoiced for payment. The payment can be for the single service or a number of services that the service consumer is still interacting with. As part of the customer payment, a debit transaction can be issued with the service consumer's bank. Correspondingly, a credit transaction can be made by the service consumer's bank to the service broker's bank for money flow, and credit transaction details can be issued with a payment engine used by the service broker.

Continuing with the payment example, the service broker can issue the fact of the credit transaction (related to the service consumer payment) through the payment engine, the payment provides confirmation and the service consumer is receipted. The payment engine forwards the service broker credit transaction details to the service broker's bank. After service consumer payment has been completed, the service can proceed to service fulfillment, for example. The service broker can issue remittance of payment to the individual service providers through credit transactions against their account. Details of payments (including reconciliation details) from the service broker to service providers for services that have been delivered through the service broker are reported to the service providers. These can be reconciled against transaction reports from service provider banks.

In general, the service broker manages the collection of payments from service consumers and the disbursement of payments to service providers, for the different aspects of service provisioning, be they brokering, aggregating, hosting, gatewaying and channeling a service. The management of payments can be such that payment related pre/post-conditions for service steps can be evaluated, so the overall delivery of a service remains seamless. Flexible, incremental pricing can be supported for a service as that service becomes provisioned to different concerns and through different partners. By enabling integrated payment management incurred from SDF provisioning of services, the service broker does not necessarily support management of payments not related to services stored in its repository and out of scope for service delivery. For example, the service broker does not provide a general billing engine for cloud providers or partner relationship management.

Different pricing models can be supported (e.g., pre/in-situ/post-payment, pay-per-use, pay per service transaction points, monthly subscriptions, pay per number of users, pay per number of records), and different payment methods can be supported (e.g., credit card, debit card, cash, check, BPay, rewards). Support can also be provided for split payments (e.g., part cash, part credit card).

The process of payments can be well-defined where interactions with stakeholder systems are transparent (e.g., those of providers, banks) In this connection, the service broker can enable reporting and reconciliation of payment transactions with service providers and provisioning partners. The service broker can support integrated payment for a group of services being accessed by service consumers (e.g., services accessed as part of a service bundle, shopping cart across the transactions within a session allowing a customer to make a single payment for a group of transactions). Each of the services included under integrated payment needs to be in a state where the collective payment being made satisfies the current and future steps of the service. The service broker can also support a partial refund should one item in the group of services being paid prove in a later step not be satisfactory or fulfilled to the required agreement with a service consumer.

The above features do not strictly imply that a service broker runs a payment engine. One or more third-party payment engines could be used instead, through a payment interface with the service broker.

The service broker further provides for service consumer session management. In general, session management is used as part of a strategy for controlling the way remote clients access resources hosted on a platform. Through sessions, servers are able to enforce authentication of clients including issuing of security tokens to clients upon first encounter sessions after clients provide naming credentials. Security tokens can be used for subsequent sessions, saving clients from having to again provide details of credentials. Sessions facilitate this, because the server associates them with clients and manages security tokens within the sessions. Sessions can also be used to manage other information concerning access of resources through the platform such as date/-time of sessions, session duration, services accessed.

Applied to the service broker, clients access information and services exposed through consuming applications and channels (e.g., Point-of-Single-Contact self-service channel, Contact Centre channel), which are retrieved under the control of the service broker. Services, in particular, are to be discovered, accessed and tracked. Although service interactions occur through remote applications (e.g., consuming applications and channels), consumer session management is performed through the service broker to control the interactions at the service broker level.

Multiple services may be accessed, including access through groups such as service bundles and shopping baskets. Some services (e.g., property conveyance, life events and business formation) can involve multiple steps and are achieved in several sessions, potentially over the course of several days and even months, prior to finalization and fulfillment. Service consumers are able to put such services, once opened, "on hold" for a period of time and be resumed potentially through a different business channel/agency/operator or technical channel. In other words, a service can be accessed through a number consumer sessions over a certain duration.

Accordingly, a consumer session includes which services have been accessed, in what grouping context and which ones remain open. Other data that could simplify interactions (e.g., geographic locality or other customer details like payment methods, citizen I.D., and list of entitlements, for example) can be stored in a consumer session, allowing these to be used through interactions with services accessed in that specific session and passed to subsequent sessions of the consumer. In this sense, a consumer session provides a basic CRM capability. However, the data stored as part of a session is not permanently persisted, and only lasts until all open services of a service consumer have been completed. This may occur within one session, in which case the data is only persisted for that session, or it may last more than one session, in which case the data is passed to the sessions until all services have been completed and the consumer logs out.

In general, the service broker controls consumer interactions with exposed service broker functionality (e.g., service discovery, information document access, service interactions, payments and helpdesk assistance) through consumer session management. The following example functionality can be provided for consumer session management:

Creation of a consumer session and maintaining data required for a session.

Getting the handle to a consumer session, and providing the means for a consuming application, user (customer or operator) to obtain session related information for situations like service access, service assistance, auditing, tracking and systems management.

Deletion of a consumer session. No further action can take place using that session after it has been deleted. The deletion of a consumer session occurs when the user logs out or a session is timed-out.

Sessions contain data that simplifies interactions between service consumers and the service broker. This can include the following examples:

Creation of a consumer session and maintaining data required for a session.

Service consumer use context: customer/partner identification data, assisting operator data.

Services and service groups accessed.

Payment references.

Logged interactions that have taken place within the session (where logging is necessary).

Session time of access and duration.

User contexts, services and payments need be passed across consumer sessions to enable services to be accessed across more than one session.

The extent to which a single service step can be split across sessions depends on the way a service's orchestration steps have been exposed. If a service step involving filling details into a large form can be saved without all details entered into the form, then it can be possible to end the session without loss of the data entered and a new session to be opened where the remaining details can be filled in and the service step continued. Action steps of a service, however, are not split across sessions. An action should be completed properly before a session is terminated, otherwise the action is "rolled back," if the session effectively "breaks" an action.

The service broker enables tradable entities (e.g., products, goods or services) to be ordered in groups that drive up demand as functionally related groups that share a common purpose, or as single orders for customer convenience and single payments. A service or product bundle is an example of the first, where entities are combined into one offer, even if they are not necessarily related or cross-orchestrated. Credit card accounts, stock market reporting, stock ordering through affiliated alliances are examples of services that could be bundled together with a business formation service, but which are not critical for actual license provisioning. A composite service that has been created through a service marketplace is an example of the second. An e-commerce shopping cart for services is an example of the third. The business formation has aspects of both the first and second forms.

Although groupings of services appear to have the same characteristics as grouped ordering of goods from e-commerce marketplaces, there are subtle differences. Services have an interactional pattern of execution, unlike that with goods that need a refinement of the notion of grouping. Furthermore, execution of individual services results in certain data state that is relevant to other services that are part of a group. Sharing of information related to the services in a group, and information that can change based on execution of the services, is one such difference. As services execute, referrals for further services could occur (e.g., for a business license provision requirement, an unforeseen service may be required for information to be provided to an already running service). Consequently, dynamic addition of services to groups is useful capability to have, as is, correspondingly, dynamic removal of services from groups. In considering removal of services, arbitrary removal is not permitted for services that are still executing. Only abnormally or normally terminated services are removed.

With regard to service grouping, the service broker enables service providers and partners to be able to define bundling of services for competitive or convenience reasons, where the bundles do not necessarily contain functionally related or orchestrated services. Service bundles can be supported through service groups in the service broker. Constraints for bundling of services in service groups can be specified conveniently. For example, when a bundle is accessed all services, one or a specific number, are consumed. For complex bundling requirements, arbitrary levels of nesting of service groups can be required (e.g., a property conveyance service bundle consists of a number of services including a property map, the conveyance process which is orchestrated and a land check service bundle). Constraints to allow for dynamic additions to bundles can be specified conveniently (e.g., referrals to get information from federal government services for property checking might be required as part of property conveyance). It can also be possible to share common master data for a group, and this can be specified conveniently. Further, payments made for service groups can be grouped for single invoicing/receipting.

The service broker enables a service consumer to order services within the context of a group or bundle. Users need to be able to order and access services in the context of groups implementing service bundles and shopping baskets/carts. The service group can be visible to the user while the services are being accessed, even though the services are not orchestrated as a composite. Anonymous users (i.e. "guests" who are not named) who are accessing security insensitive services such as ordering freely available documents can only have one service group at any given time. Named users can have one or more (named) service group. Depending on the constraints defined for service groups, users need to be able to insert and remove services from a group after it has been created, and move services between groups. Note, removal of services from a group may be implicit, after the service is completed, or it may be explicit if users are allowed to remove some of the services prior to their execution.

The service broker further provides for service analysis and re-factoring. In particular, the service broker enables service utilisations (i.e., logged service interactions) to be analysed individually and across many instances. Support for refactoring services along consumption patterns can also be provided.

The service broker can also provide for service troubleshooting and dispute resolution. In particular, the service broker can provide "helpdesk" support for consumer and other partner assistance during execution of services. Service exceptions and dispute resolution can be included as part of service descriptions and are be accessible by service consumers during the execution of services.

The service broker can further provide for systems management. In particular, the service broker can allow its operational environment to be managed (e.g., through a systems console). In some implementations, partners can have access to the service broker's management facility for particular functions (e.g., particular views of systems dashboards for understanding systems load and throughput).

Business applications and interfaces (e.g., CRM, payments) are supported. In particular, a number of technology components required to support electronic service delivery could either be implemented as a single W-O-G facility, or implemented as agency-specific facilities. In cases where the desired functionality does not dictate their centralisation, factors such as economies of scale become the major considerations as to whether to implement them centrally. An example of this is a payment component. The SBP requirements do not dictate that it be centralised, however, the government may elect to establish a centralised payment facility for reasons other than technological necessity. A billing component enables creation of invoices for service instances, contracts and offers based on the execution logs. The payment component manages the user's payment instruments, and enables invoices to be paid and checks as to whether an invoice was paid. An accounting component manages the user's invoices and the payment receipts.

The SDF provides managed interfacing between service provider environments and the service broker. Interactions between the service provider environments and the service broker platform are supported through explicit interfaces. Programmatic interfaces are provided for externalisation of relevant operations for interactions to take place. For example, interfaces are provided for service partner registrations with the service broker, service discovery, and deployment and provisioning of services by service providers on the service broker platform. Interfaces are also provided for runtime service interactions between the service broker platform and service provider environments when consumers access services, and service provider monitoring and management of their services on the service broker platform.

Interactions involved in these scenarios enable quality of delivery considerations including secure connections and reliable delivery, as needed by service providers. From a service provider's perspective, the interfaces are required to support programmatic interactions in-bound and out-bound to the service provider's environment. As such, they could facilitate integration of service provider resources for accessing internal applications, such as application gateways, so that interactions between service provider environments and the service broker platform are seamless.

Service composition is the amalgamation or blending of related services into a new service that a service consumer can access via a single interaction. The SDF infrastructure, however, does not inherently provide service composition. Instead, the SDF provides that each service relates to a single backend agency. Service composition in the SDF occurs within backend service delivery systems. This is consistent with the principle of service information hiding, and greatly simplifies the functionality offered, focusing on coordinating service delivery and leave service content as the total responsibility of backend agencies. If required, such composite services could be offered by a lead agency that manages the complexity of the integration with all the other participating agencies, and presents the service as a single composite service through the SDF. There is a clear delineation between service coordination and service content composition. Mechanisms and infrastructure that are established to support requirements can be used to support such lead agency service composition.

Service providers are provided access to a comprehensive set of tools and processes that enable them to define services and to compose these into value-added services, such that they can be provisioned using the service broker. Services relate to applications, systems and business operations of service providers, and the tools and processes for service enablement and composition focus on the aspect of service exposure. The tools and processes are required for the capture of service catalogue descriptions including functional descriptions, non-functional descriptions and service dependencies across functional and non-functional aspects. The tools and processes also are used to capture technical aspects of service enablement, modelling of services for communication or execution purposes, inclusion of SLAs and execution related artefacts (e.g. form templates, message types). The tools and processes can run either locally in service provider environments or can be available through a central environment accessible for all service providers.

Service providers are able to deploy services under their ownership and provisioning control to the service broker. The deployment process supports secure and completed upload of services for supplied descriptions, models and components. As part of this, service packages can be checked for consistency so that they can be accessed and executed through the service broker. Notification of any warnings, errors or inconsistencies can be reported to the service providers during the deployment process. If a service is requested for upload with the same description and version as a previously uploaded one, a warning can be sent to the user for over-writing or auto-versioning. For large-sized services and large volumes of service upload, requests for service deployments can be scheduled for optimal upload. Service providers can also un-deploy services from the service broker.

Service providers also have access to a comprehensive set of tools and processes that enable services available on through the service broker to be further provisioned. Further provisioning means that services can be extended for brokered offers, re-hosted through Cloud environments, adapted through third-party B2B gateways, and have new/modified UIs for new consumption channels. Service providers are able to control the steps involved in further provisioning of services including changing service availability, SLAs, revenue share of pricing and other aspects of service descriptions and artefacts. Service providers are also able to delegate responsibility for further provisioning to other partners in the business network, and to grant access privileges accordingly. The delegation of this responsibility may require that third-parties collaborate with the originating service providers under the regime of well-defined separation-of-duties. The tools and processes provided for further provisioning of services extend to technical aspects of service enablement, modelling of services for communication or execution purposes, inclusion of SLAs and execution related artifacts (e.g. form templates, message types). The tools and processes can run either locally in service provider environments, or can be available through a central environment accessible for all service providers.

Run-time service interactions with applications and systems in service provider environments are also supported in the SDF. Interactions within service provider environments, notably interactions with applications and systems, can be supported through secure and reliable connections, and through designated resources such as gateway/connectivity resources. In this manner, exposed services on the service broker can be interacted with.

The SDF also supports service monitoring and management. Service providers are able to monitor the usage of their services and systems that their services have been further provisioned in. The systems under scope for service monitoring include the service broker platform, cloud environments, B2B gateways and consuming environments. Service providers need to be able to monitor sufficient information about service access through these environments in order to understand the performance, risks and opportunities for exposing their services in the business network and allowing their further provisioning in different ways. Data analytics in symbolic or graph form can be available on different levels, as requested by service providers (e.g., on a per-service, services by selection criteria, or all services).

Data being monitored may relate to systems utilisation and performance concerning services, criteria for service access (e.g. number of services initiated, number of services completed) and/or criteria for service delivery (e.g. number of services with outstanding payment, revenue statistics for services in a category). Service providers are able to view systems utilisation and performance data where appropriate. For example, a service provider can view the performance of the service broker and cloud environments that are used in the further provisioning of their services. A convenient implementation of this is through a service provider "cockpit" (or console). Service providers can control the availability of their services in the different environments through which their services are provisioned using such a service provider "cockpit."

Business channels represent the type of service access from the service consumer's perspective. Examples include service centers, call centers, kiosks, and postal mail. An outlet is a specific service access point, and has an associated address such as a street address for a counter channel, a phone number for a call center channel, and a web address for an internet channel. An outlet may have multiple devices of the same type sharing a common technical channel (e.g., call center telephones, counter computers, or an Internet portal). However, in situations such as a self-service kiosk co-located with a counter operation, the outlets are considered to be different because they represent different business channels, use different technical channels, and are potentially sponsored by different brokers.

Technical channels are accessed via computing devices (e.g., desktop and/or laptop computer, mobile devices, PDAs). A distinction is drawn between technical channels and computing devices, because some technical channels can support a range of computing devices and conversely, some computing devices are multi-function and can operate with more than one technical channel. For example the digital mobile phone can operate via a tone function to access an IVR channel and can also operate via SMS or WAP to access a Web channel. These considerations are important, because, although an entity has the ability to select its own computing devices, the entity cannot change the computing devices that the community owns and must work within their limitations. Channels created through the service channel maker can support the automatic maximization and minimization of service presentation based on personalization and other context-sensitivity techniques.

In some implementations, the computing device is not always the item of electronic hardware the customer is operating. For example, when a customer calls a call center, the computing device is the agent's personal computer, not the telephone the customer is holding in their hand. Experience from other cross-agency service delivery initiatives has highlighted the risks of offering common functionality through diverse agency specified standard operating environments (SOE). Multi-channel service delivery across government requires the adoption of standardized devices. Such standard devices can be as simple as common capability specifications that all agencies agree to provide and support. In some cases, it can be a fully outsourced arrangement with a common provider supplying, configuring, and maintaining them for all agency service delivery environments.

Standards for each type of device can be provided. Such standards can include standards for non-government broker or customer owned devices. These latter standards would have no influence on the acquisition or configuration of such non-government devices, but provide a consistent target platform for both the service delivery infrastructure and agency specific systems to operate through. Standard devices can incorporate both software and hardware components such as Smart Card login, printers and print spoolers, barcode scanners, and digital cameras. Standard devices can also include support for existing agency service delivery systems.

Commoditized services, in particular those delivered on behalf of providers through third-party intermediaries, strive for a high-volume, wide audience base and agile market penetration for new and unforeseen opportunities. The wider the audience and consumer segments, the more diverse the settings through which services are accessed and are interacted with. Different settings mean more than different business channels (business application outlets for consumers to access services). They also entail different technical channels through which services are consumed arising from different devices and different geospatial and temporal points of access.

To this end, services can be architected in a way that allows for their user interfaces to be adapted to different business and technical channels. The user interfaces of a service can be specified in a way that allows for flexible transformation to different channels, from the point of view of technical (device) presentation but also the business semantics of the channel. For transactional services, such as business formation, interaction with user can be long-running, going from days to months. To promote flexible interaction with the service, different channels can be provided, from standard browser-based channels to mobile and even voice channels. Accordingly, the adaptation of service user interfaces is dynamic, depending on which channel is involved for a user interaction.

A further aspect of multi-channel service consumption in a diverse setting is the different environments, platforms and languages associated with channels. For consuming applications to interact with the systems supporting third-party intermediaries, requirements for software adaptation for consumer applications can be kept to a minimum. Proxies can be deployed into channel environments to contain service interaction logic and messaging with intermediaries, etc., freeing consuming applications from these details. The proxies can provide intelligence in determining where user interfaces should be transformed during service interactions. For example, heavy-weight, business semantic transformations for business channel constraints and requirements can occur through the intermediaries. Lightweight device-specific transformations can occur through the consumer environment. The service delivery manager ensures that consumer connections with services and service interactions take place in a way that minimizes the overheads for consumer "plug-in" and transformations of service presentations to different channels and devices.

In some implementations, a service channel maker provides an integrated widget composer. In this manner, the service channel maker enables service presentation components (widgets) to be composed (correlating data elements of widgets) for the purpose of service presentation and interactions, in the context of the creation of channels. For this purpose, a widget composer can be interfaced so that it can be used as part of tooling of the service channel. A widget repository can be provided so that services can be searched on and their widgets can be selected during the design of channels. The widget composer can be extended to use service semantics. In particular, the widget composer can enable correlations between data elements of widgets to be based on semantic descriptors (e.g., ontologies, metadata tags).

An integrated Web authoring tool with service channel can also be provided. In addition to widget composition, the service channel maker can enable text and general UI layout to be instrumented for the design of a channel. The collective tooling for a service channel, as such, should be the Web authoring tool. Web applications can be generated as a result of channel design. Web authoring can be extended to use service semantics. In particular, the Web authoring tool utilized for the service channel maker can provide for the utilization of service semantics and context information.

Figure 4:
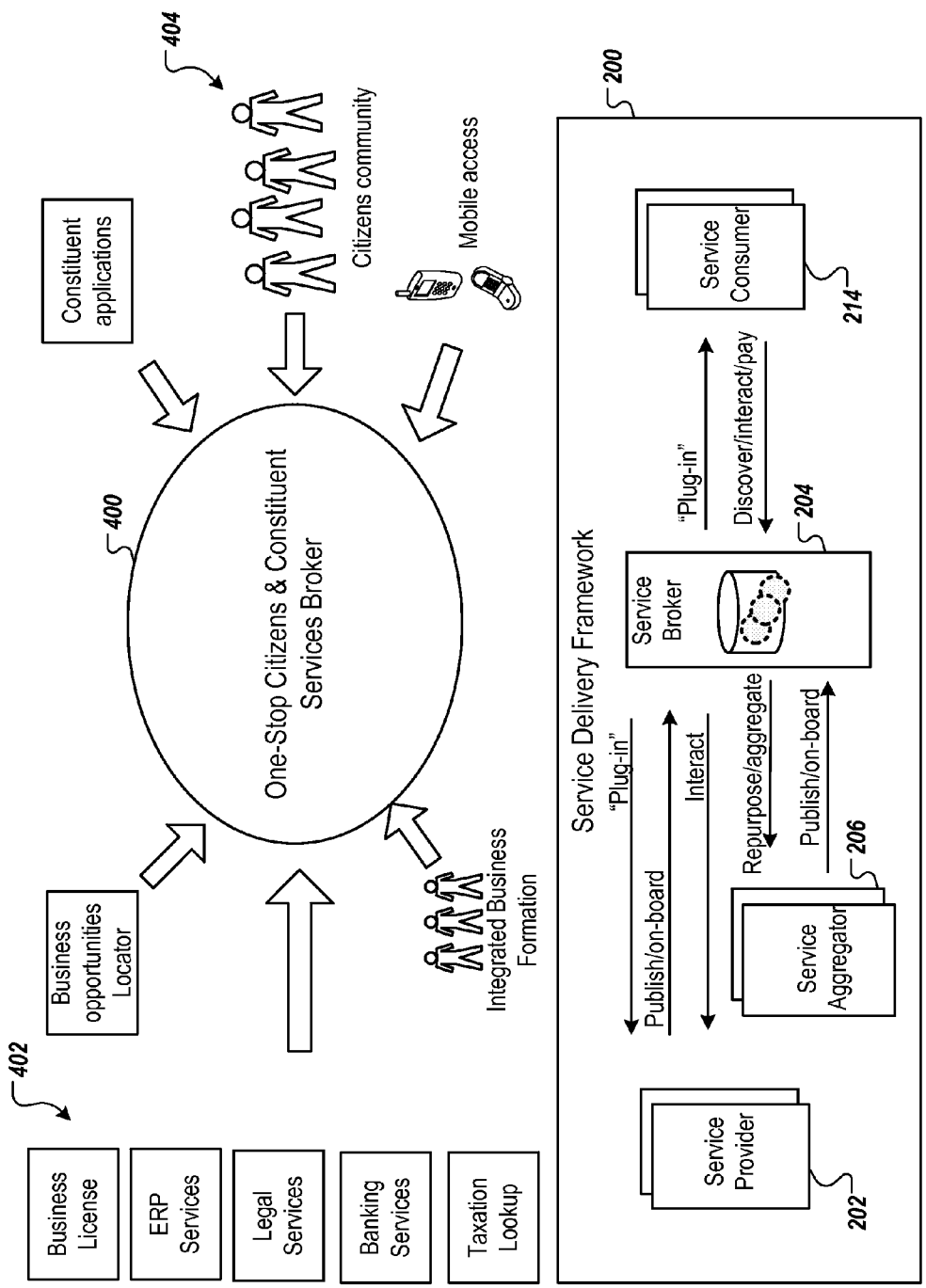
FIG. 4 is a block diagram depicting SDF support for service marketplaces.

Referring now to FIGS. 2 and 4, the SDF 200 provides an industrialized platform for creating service marketplaces for different business networks, in different industries. FIG. 4 is an example of an eGovernment service marketplace operated by a One-Stop Citizens and Constituent Services Broker 400, supported through the SDF service broker 204. The SDF 200 enables public sector and private sector partners, supported by the service provider modules discussed above, to publish their services 402 through the service broker 204. Agencies would be granted permissions for publishing services in a central directory of the service broker, making these services available to the marketplace.

In some implementations, services execute in hosted back-end environments controlled by agencies and are interfaced through the service broker 204 so that they can be interacted with. A provider-broker interface enables secure and reliable interactions between the agencies and the service broker 204. The interface supports internal gateways of agencies to be "plugged-in" so that the gateways of agencies are not compromised. A variety of consumers 404 can then access the broker agency by being "plugged-in" through the service consumer module. This part of the SDF 200 executes through consumer environments and it supports interface and access with the service broker for service discovery, ordering, access, metering, payment and the like. A potentially open-ended set of consumer points can register to access the service broker. A pattern of interaction for service access is a request-response for service steps: forms are displayed and filled in by consumers, they are sent to the service broker which passes the request to service providers through the service provider modules. Responses from backend service applications are returned to the service broker and are passed to the service consumer for display through the consumer's device. The service consumer modules can also be used to support just-in-time forms transformation for the channel-specific display (e.g., on a mobile device).

To support marketplace creation and operation, as described above, the SDF provides Web pages and portals enabling a service cataloging process that is available through the service provider. This enables agencies to describe their services and include all the available execution artifacts (e.g., public interface, forms, message types, and the like) to be uploaded and available on the service broker. The service cataloging process enables both functional and non-functional properties of services to be captured, based on a service meta-data language. An example meta-data language can include the Unified Services Description Language (USDL) provided by SAP AG of Walldorf, Germany. USDL supports descriptions of general aspects of a service (e.g., service naming, version, description, type, ownership, releasing, dependencies, document links), links to execution artifacts and dependent resources (e.g., applications that use services), legal, pricing and service level agreements. Different types of services can be described, from different industries, including human/professional, informational, transactional, digital media, platform and infrastructural, at different degrees of granularity and composition. Core, compound, composite and bundled services can be described together, including their functional dependencies. USDL also enables integration of domain-specific service taxonomies to be used through which individual services can be annotated against.

Other Web pages and portals enable interaction between service providers and the service broker. For example, partners can register as service providers, third-party aggregators, consumers, third-party channel partners, third-party cloud providers and third-party B2B gateways. Each partner registers with the service broker and is granted access to services, of particular categories, for actions, in particular categories (e.g., access to create aggregates of services in certain categories; and access to create channels out of services in certain service categories). A listing of services created during search/discovery can be provided through the service broker directory, after a partner has signed in.

To understand the full implications of using or extending a service, the service directory of the service broker enables dependencies with other services and resources to be captured. Through the service broker, the dependencies can be visualized. In addition to classical functional dependencies (e.g., a service requires one or more sub-services), other forms of dependencies can be captured and visualized. For example, an includes dependency (e.g., a service contains one or more other services), a mirrors dependency (e.g., a service is equivalent to one or more other services), a substitutes dependency (e.g., a service can be replaced by one or more other services), a conflicts dependency (e.g., a service should not be used with one or more other services), and an enhances dependency (e.g., a service enhances one or more other services) can each be visualized. This feature is also used in the service provisioning tooling of the service provider, so that in-house constraints and contexts of services can be carefully analyzed before being exposed to a business network.

Services can be registered once they are uploaded through the service provider. In some implementations, registration includes running certification checks for risk mitigation. Once services are registered, they can be on-boarded to run through the service broker's run-time delivery management system. To achieve this services can be adapted to be accessed through the run-time system and adapted such that consumers can access the service through the service broker. By way of example, a business formation service can be created by a service aggregator who combines various services responsible for granting a business license, and then uploads the service to the service broker for registration.

A particular aspect of on-boarding relates to the service broker performing "front-desk" delivery on behalf of service providers. Examples include identification of customers as maintained through the service broker, collecting payments, metering particular selections and actions made on service for market analysis and service refactoring, and assistance in service settlement. By way of non-limiting example, the business formation service can be configured for payment collection that will be performed by the service broker on behalf the service providers. The business formation service's public process captures the interactions seen by a consumer of the service. These interactions express information steps performed the consumer (e.g., filling in data in forms) and responses from the service providers (e.g., as a result of processing the data provided by the consumer). The interactions can be combined into phases (e.g., Indentify License Type, Settlement) that yield milestones (e.g., Provisions to Create License Satisfied), which are provided as input for other phases. For example, a payment step (e.g., Payment instrument identified and validated) can be configured as a pre-condition for interactions grouped in a phase Fulfill License Type. This can be achieved through the service broker's payment engine, allowing the service broker to perform it as a "front-desk" delivery function on behalf of the service providers.

As a result of on-boarding a service to be delivered through the service broker, the service is available through the service marketplace to be ordered, accessed and executed. In some implementations, some steps of the service require actions to be processed in the service's backend application (e.g., running in a hosted environment controlled by the provider), while other steps are executed through the service broker, alleviating the service provider of performing these.

On-boarded public processes of a service are orchestrated through the service broker. Each process activity involves either a consumer-provider request-response action or an action executed through the service broker, as discussed above. Where the consumer is involved in the interaction, a form can be displayed, for example, filled in by the consumer and passed to the service broker.

Figure 5:
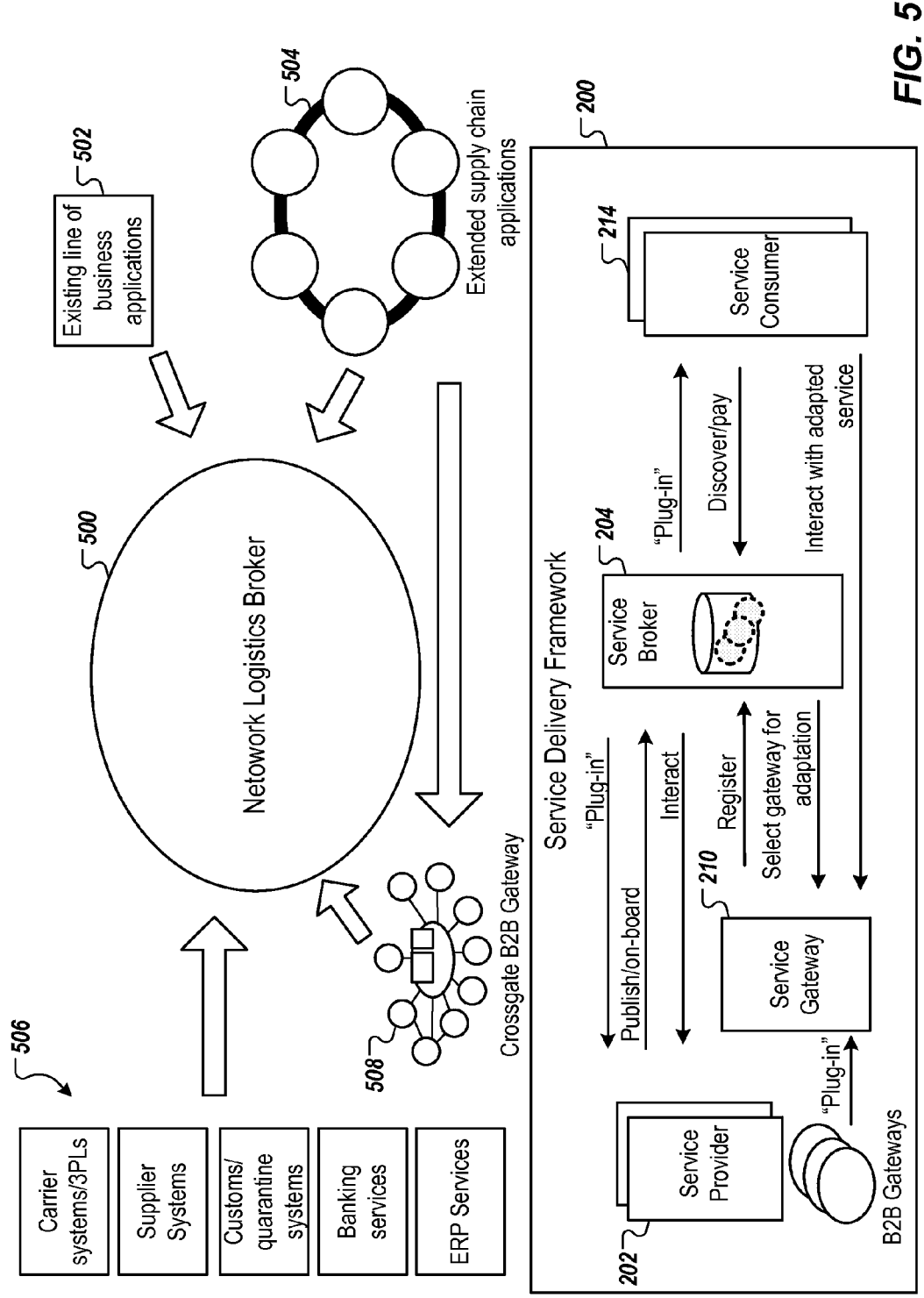
FIG. 5 is a block diagram depicting SDF support for business-to-business (B2B) partner connectivity.

Referring now to FIGS. 2 and 5, SDF support for B2B partner connectivity will be discussed. A barrier for business networks to grow beyond static partnerships and inefficient process orchestration (e.g., basic fax, email and paper-based communications) is connectivity. Networks thrive when partners use a common application platform, because a standard set of reference processes, master data and message exchange applies for the different partners. However, when partners want to interoperate services from heterogeneous applications and platforms, especially evident in wide spanning, global networks, the heterogeneity of service interfaces and message types used can be a hurdle. In this case, the services need to be adapted so that the message types will be compatible for service interoperability. For each pair of services interoperating, adaptors need to be created, leading to an explosion of adaptors as the number of services increases. As an alternative, a common standard needs to be established through which the individual services are adapted.

The SDF of the present disclosure accelerates connectivity between partners by enabling different B2B gateways to be exposed and utilized through a broker for service adaptation. In the example of FIG. 5, such a broker includes a network logistics broker 500. As discussed above, B2B gateways are particular third-party business process outsourcing (BPO) services that support outsourced interoperability based on the B2B standards that they support. If partners need to interact with a service using a certain standard (e.g., the VICS standard), then the standard can be selected so that an interface over that service can be created and used for interactions with the partners. B2B gateways enable design-time interface creation (e.g., mapping of message types from the service and the target standard), and run-time message translation through store-forward messaging.

FIG. 5 depicts an existing supply chain working through a particular orchestrator or commercial network, indicated by existing line-of-business applications 502 operating within the partner companies. The partners have some pre-defined interoperability in place, like Web portals, email and faxes for communication. Some of the applications requiring business critical interaction can have dedicated integrated mechanisms in place. Extended supply chain applications 504 can be provided. To extend supply chain partnerships, one-off integration efforts can be costly and inefficient. The SDF can improve efficiency for existing and future partnership growth. As shown in FIG. 5, business services 506 can be published through the service broker where they can be adapted using third-party B2B gateways 508 to improve the range of B2B standards coverage and reduce the effort involved in adaptation.

B2B gateways can be accessed through the SDF by being "plugged-into" the service gateway. The service gateway provides generic tooling for design-time adaptation of services for the different standards available through the different gateways. The service gateway further provides a run-time façade interface that delegates calls to the B2B gateways that are "plugged-into" the service gateway. The available B2B gateway services are registered with the service broker. In this manner, when a service needs to be adapted, a B2B gateway service can be selected, adapted, have its run-time adaptor deployed in the selected B2B gateway. Further, the B2B gateway can be published as a service in the service broker. When network partners need to interact with a service interface in a particular B2B standard, they can discover a version of the service that has the required interface and can interact with the service (e.g., either using the reference delivery model, or using the mediated delivery model).

Figure 6:
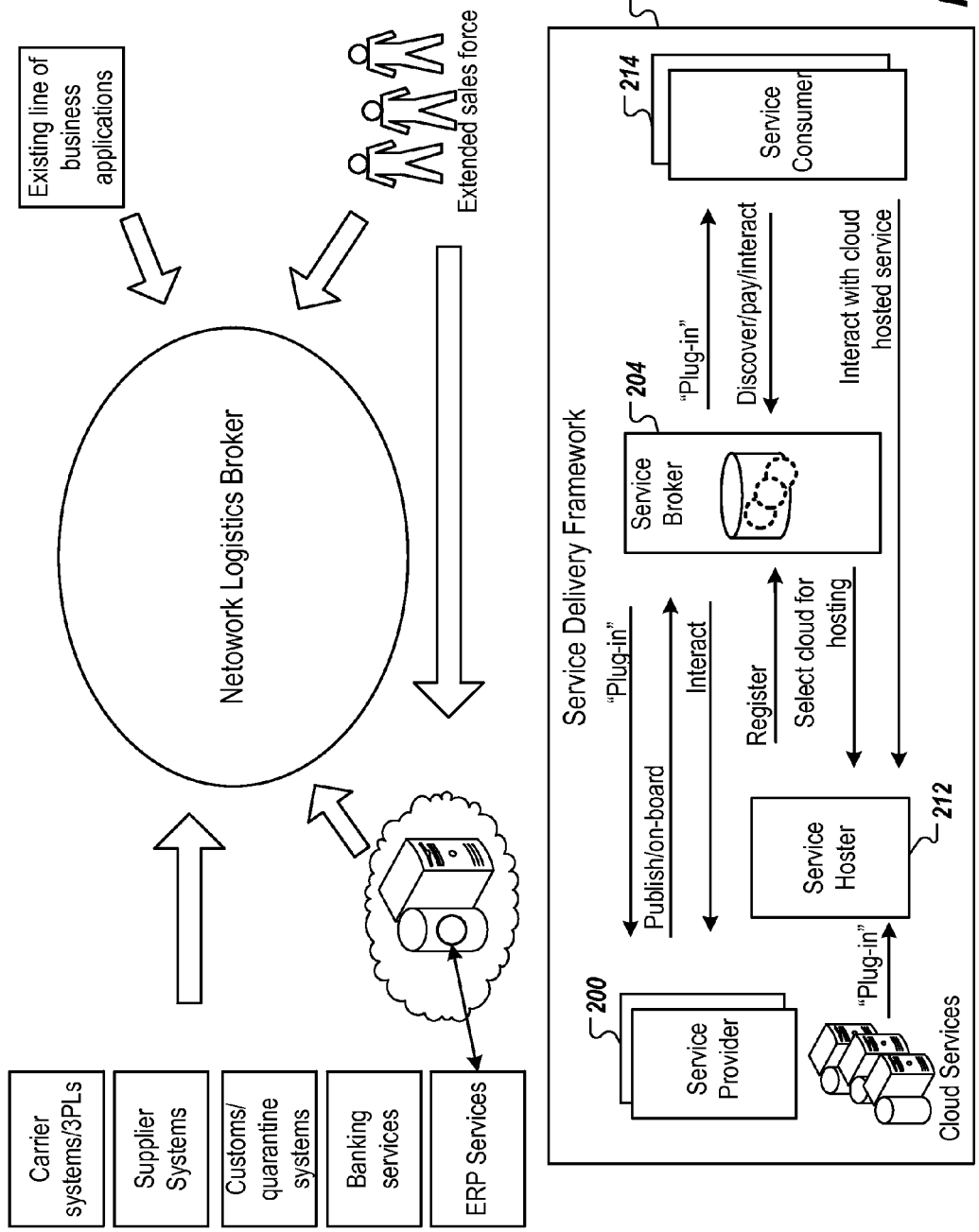
FIG. 6 is a block diagram depicting SDF support for hybrid, on-demand/on-premise software solutions.

Referring now to FIG. 6, the SDF supports hybrid, on-demand/on-premise software solutions. Traditionally, enterprise suite vendors have relied on partner ecosystems for diversification of their solutions. However, the proliferation of applications available on the Web and open source applications has outpaced the growth of software produced through the partner ecosystem model. This has resulted in a lag in the extended repertoire of enterprise solutions through external, value-adding applications. As opposed to thinking about software solutions being offered as either on-demand deployments or on-premise installations, the trend for corporate customers now is the best of both worlds—a hybrid, on-demand and on-premise, solution space.

The SDF of the present disclosure supports such a hybrid configuration to provide dynamic growth of a business network. In the example of FIG. 6, ERP solutions used by the supply chain partners are diversified by smaller, on-demand solutions offered in cheaper, cloud environments. In the example, existing corporate partners are dispensed with task management solutions, order-to-cash and other smaller solutions for individuals and very small companies, acting as outsourced sales lines in the supply chain. This saves a nimble, external sales force from having to use large, in-house enterprise solutions for their isolated needs. As illustrated in the example implementation of FIG. 6, on-demand solutions are offered through a cloud and are integrated with a backend ERP.

As discussed above, cloud services are accessed in the SDF through the service hoster. In particular, the service hoster provides a way for the cloud services to be "plugged in" so that their services can be accessed through a single generic interface. A generic interface acts as a façade for the operations on concrete cloud services. Through the interface, access to the hosting operation of different clouds and obtaining performance monitoring and accounting information are available. The available cloud services are registered with the service broker so that, when a service needs to be hosted, candidate cloud services (with virtual machines that can host the service) are matched and selected. By obtaining performance monitoring, service providers can assess whether cloud services are satisfactorily performing. If performance is not satisfactory, the service provider can re-host services through another cloud without, in principle, changing any interfaces of the service. A variant on re-hosting use cases is the choice of hosting offered as part of negotiations with users when they order and access services. Hosting choices could be presented to users and dynamic hosting could take place after a selection is made.

Beyond refactoring of UIs, the SDF further provides a way for third-parties to drive up new channels in business networks. Because services that can be registered and on-boarded for access to the service broker expose corresponding UIs, among other technical artifacts, it possible to create new business channels. The new business channels involve different technical channels associated with device types (e.g. Web-based, mobile, desktop GUI). The capacity for channel creation in a business network and out on the Web drives up service consumption and re-monetization efforts.

Figure 7:
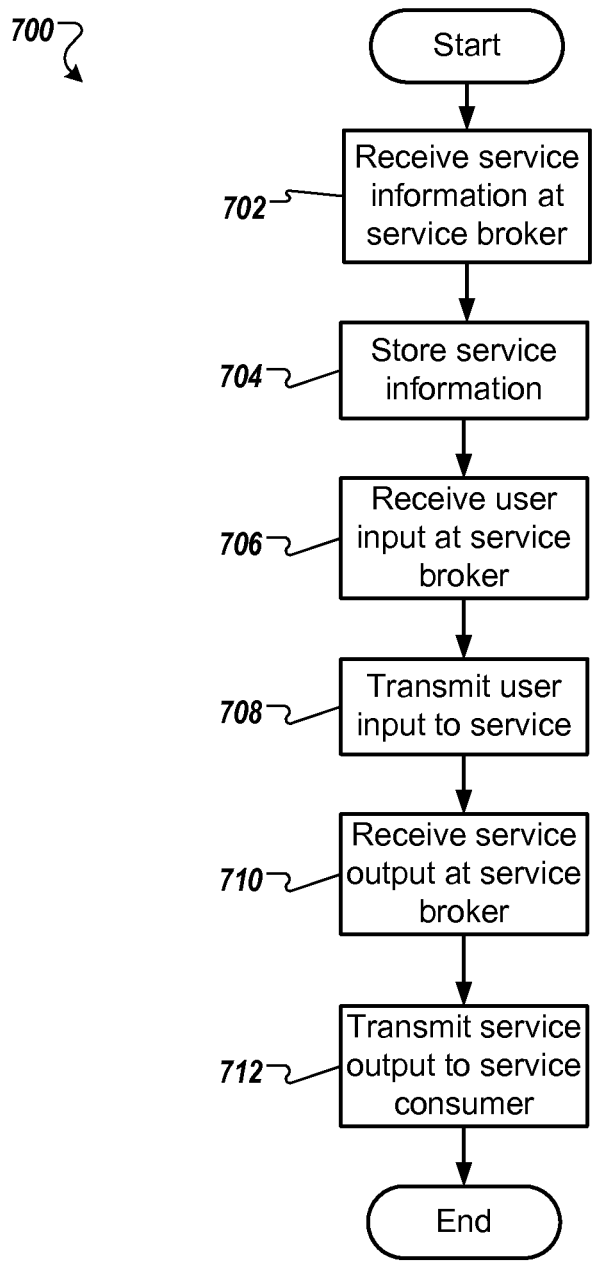
FIG. 7 is a flowchart of an example process that can be executed in implementations of the present disclosure.

FIG. 7 is a flow diagram of an example process 700 executed using an SDF in accordance with implementations of the present disclosure. Service information regarding one or more services provided by one or more service providers is received at one or more broker computing devices (e.g., computing system 108 of service broker 120 of FIG. 1) (702), the services being executed by one or more service computing devices (e.g. computing systems 108 of service providers 122 of FIG. 1). For example, the service information can correspond to service description information. The service information is stored on a computer-readable storage device that is in communication with the one or more broker computing devices (e.g., computer-readable storage device 114 of computing system 108 of service broker 120 of FIG. 1) (704).

User input is received at the one or more broker computing devices (706), the user input being transmitted to the one or more broker computing devices from one or more consumer computing devices (e.g., computing system 102 of FIG. 1) over a service channel that corresponds to a service being accessed by a service consumer (e.g., service consumer 104 of FIG. 1). The user input is transmitted to the one or more service computing devices (708). Service output is received from the one or more broker computing devices (710), the service output generated based on processing of the user input using the service. The service output is transmitted to the one or more consumer computing devices over the service channel (712).

Figure 8:
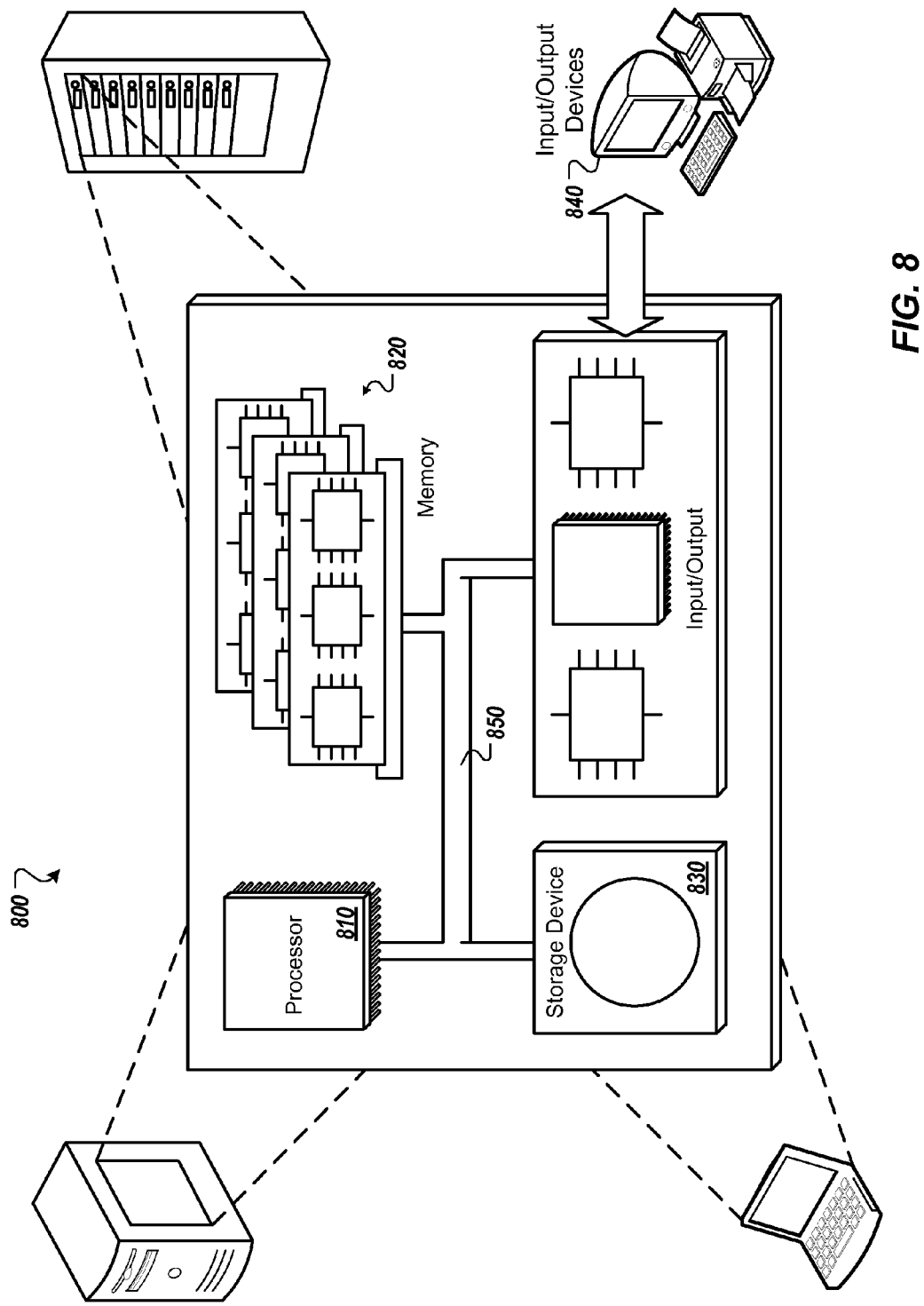
FIG. 8 is a schematic illustration of example computer systems that can be used to execute implementations of the present disclosure.

Referring now to FIG. 8, a schematic diagram of an example computing system 800 is provided. The system 800 can be used for the operations described in association with the implementations described herein. For example, the system 800 may be included in any or all of the server components discussed herein. The system 800 includes a processor 810, a memory 820, a storage device 830, and an input/output device 840. Each of the components 810, 820, 830, and 840 are interconnected using a system bus 850. The processor 810 is capable of processing instructions for execution within the system 800. In one implementation, the processor 810 is a single-threaded processor. In another implementation, the processor 810 is a multi-threaded processor. The processor 810 is capable of processing instructions stored in the memory 820 or on the storage device 830 to display graphical information for a user interface on the input/output device 840.

The memory 820 stores information within the system 800. In one implementation, the memory 820 is a computer-readable medium. In one implementation, the memory 820 is a volatile memory unit. In another implementation, the memory 820 is a non-volatile memory unit. The storage device 830 is capable of providing mass storage for the system 800. In one implementation, the storage device 830 is a computer-readable medium. In various different implementations, the storage device 830 may be a floppy disk device, a hard disk device, an optical disk device, or a tape device. The input/output device 840 provides input/output operations for the system 800. In one implementation, the input/output device 840 includes a keyboard and/or pointing device. In another implementation, the input/output device 840 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for provisioning and delivering services in a business network, comprising:
   receiving, at one or more broker computing devices, service information regarding one or more services provided by one or more service providers in the business network, the services being executed by one or more service computing devices;
   storing the service information on a computer-readable storage device that is in communication with the one or more broker computing devices;
   receiving, at the one or more broker computing devices, a request of a service consumer for accessing and using a service of the one or more services, the request being transmitted to the one or more broker computing devices from one or more consumer computing devices;
   determining, at the one or more broker computing devices, that the service consumer is identified to a required level to meet authentication requirements for the service being accessed;
   receiving user input at the one or more broker computing devices, the user input being input by the service consumer accessing and using the service, the user input being transmitted to the one or more broker computing devices from the one or more consumer computing devices over a service channel that corresponds to the service being accessed by the service consumer;
   transmitting the user input from the one or more broker computing devices to the one or more service computing devices;
   receiving service output at the one or more broker computing devices from the one or more service computing devices, the service output generated based on processing of the user input using the service; and
   transmitting the service output from the one or more broker computing devices to the one or more consumer computing devices over the service channel.

2. The method of claim 1, further comprising generating service delivery logic at the one or more broker computing devices, the delivery logic being based on the service information and the service channel.

3. The method of claim 1, further comprising:
   storing data corresponding to business-to-business (B2B) gateway services in the computer-readable storage device;
   receiving a search query from a service provider of the one or more service providers;

generating a list of candidate B2B gateway services based on the search query and the data; and transmitting the list of candidate B2B gateway services to the service provider.

4. The method of claim 3, further comprising:

receiving a selection from the service provider, the selection identifying a B2B gateway service from the list of candidate B2B gateway services; and providing an interface adaptation between one or more service computing devices of the service provider and the B2B gateway service.

5. The method of claim 1, further comprising:

receiving data regarding an aggregate service from one or more aggregator computing devices associated with a service aggregator, the aggregated service comprising one or more services provided by the one or more service providers;

storing the data in the computer-readable storage device;

receiving a search query regarding services brokered through the one or more broker computing devices;

identifying the aggregate service based on the data and the search query; and transmitting information regarding the aggregate service to a source of the search query.

6. The method of claim 5, wherein each of the one or more services of the aggregated service executes in a respective operating environment that is accessed through the one or more broker computing devices based on a corresponding delivery model.

7. The method of claim 1, further comprising:

receiving data regarding one or more service channels, the data being provided from one or more channel maker computing devices;

storing the data in the computer-readable storage device, the data comprising service channel specifications and constraints; and associating at least one of the one or more service channels with the service.

8. The method of claim 1, further comprising:

receiving data from the one or more consumer computing devices, the data indicating a specialist service channel;

generating a list of candidate service channels based on the data;

transmitting the list of candidate service channels to the one or more consumer computing devices; and receiving a selection from the one or more consumer computing devices, the selection indicating the service channel.

9. The method of claim 1, further comprising:

receiving a search query from the one or more consumer computing devices;

comparing the search query to one or more service descriptions stored at the computer-readable storage device, each of the one or more service descriptions corresponding to a particular service; and identifying the service based on the comparing.

10. The method of claim 9, wherein the search query is specific to a type of the one or more consumer computing devices.

11. The method of claim 9, wherein the service descriptions are stored in a service catalogue, the service descriptions comprising attributes describing functional, non-functional and structural aspects of services.

12. The method of claim 1, further comprising storing one or more user profiles in the computer-readable storage medium, a user profile of the one or more user profiles corresponding to the service consumer.

13. The method of claim 1, further comprising:

executing a certification check based on the service; and registering the service at the one or more broker computing devices when a certification of the service is approved.

14. The method of claim 1, further comprising executing one or more service broker modules at the one or more broker computing devices, the one or more service broker modules communicating with one or more service provider modules executed at the one or more provider computing devices and one or more service consumer modules executed at the one or more consumer computing devices using respective application program interfaces (APIs).

15. The method of claim 1, wherein the one or more service computing devices are provided at a service hoster that is a partner of the service provider, the service hoster providing a backend computing environment that is interfaced with through the one or more broker computing devices.

16. The method of claim 15, further comprising:

monitoring performance of the service hoster using a service hoster interface executed on the one or more broker computing devices to generate monitoring information; and transmitting the monitoring information to the service provider.

17. The method of claim 15, further comprising:

identifying hosting requirements from the service information, the hosting requirements comprising at least one of platform service requirements and operating service requirements;

comparing the hosting requirements to a plurality of hosting capabilities associated with a plurality of service hosters, information regarding the hosting capabilities being stored on the computer-readable storage device, to generate a list of one or more candidate service hosters;

providing the list of one or more candidate service hosters to a service provider of the service; and receiving feedback from the service provider, the feedback identifying the service hoster.

18. The method of claim 1, wherein the service consumer is one of a human user, and an application executed by the one or more consumer computing devices.

19. A non-transitory computer-readable storage medium coupled to one or more processors and having instructions stored thereon which, when executed by the one or more processors, cause the one or more processors to perform operations for provisioning and delivering services in a business network, the operations comprising:

receiving, at one or more broker computing devices, service information regarding one or more services provided by one or more service providers in the business network, the services being executed by one or more service computing devices;

storing the service information on a computer-readable storage device that is in communication with the one or more broker computing devices;

receiving, at the one or more broker computing devices, a request of a service consumer for accessing and using a service of the one or more services, the request being transmitted to the one or more broker computing devices from one or more consumer computing devices;

determining, at the one or more broker computing devices, that the service consumer is identified to a required level to meet authentication requirements for the service being accessed;

receiving user input at the one or more broker computing devices, the user input being input by the service consumer accessing and using the service, the user input being transmitted to the one or more broker computing devices from the one or more consumer computing devices over a service channel that corresponds to the service being accessed by the service consumer;

transmitting the user input from the one or more broker computing devices to the one or more service computing devices;

receiving service output at the one or more broker computing devices from the one or more service computing devices, the service output generated based on processing of the user input using the service; and transmitting the service output from the one or more broker computing devices to the one or more consumer computing devices over the service channel.

20. A system, comprising:

one or more broker computing devices; and a computer-readable storage device coupled to the one or more broker computing devices and having instructions stored thereon which, when executed by the one or more broker computing devices, cause the one or more broker computing devices to perform operations for provisioning and delivering services in a business network, the operations comprising:

receiving service information regarding one or more services provided by one or more service providers in the business network, the services being executed by one or more service computing devices;

storing the service information on the computer-readable storage device that is in communication with the one or more broker computing devices;

receiving a request of a service consumer for accessing and using a service of the one or more services, the request being transmitted to the one or more broker computing devices from one or more consumer computing devices;

determining that the service consumer is identified to a required level to meet authentication requirements of the service being accessed;

receiving user input, the user input being input by the service consumer accessing and using the service, the user input being transmitted to the one or more broker computing devices from the one or more consumer computing devices over a service channel that corresponds to the service being accessed by the service consumer;

transmitting the user input from the one or more broker computing devices to the one or more service computing devices;

receiving service output at the one or more broker computing devices from the one or more service computing devices, the service output generated based on processing of the user input using the service; and transmitting the service output from the one or more broker computing devices to the one or more consumer computing devices over the service channel.

* * * * *